United States Patent [19]

Lenoir et al.

[11] 4,409,143
[45] Oct. 11, 1983

[54] MONOAZO DYES CONTAINING PHOSPHAMIC ACID DIESTER GROUPS

[75] Inventors: John Lenoir; Gerald Jan, both of Fribourg, Switzerland

[73] Assignee: Ciba-Geigy AG, Basel, Switzerland

[21] Appl. No.: 258,245

[22] Filed: Apr. 28, 1981

[30] Foreign Application Priority Data

Apr. 30, 1980 [CH] Switzerland ................... 3341/80

[51] Int. Cl.$^3$ ............... C09B 29/085; C09B 29/09; C09B 29/26; G03C 1/10
[52] U.S. Cl. ................... 260/205; 260/152; 260/156; 260/157; 260/158; 260/206; 260/207; 260/207.1; 260/154; 260/944; 260/945; 430/562
[58] Field of Search ........... 260/205, 206, 207, 207.1, 260/152, 154, 155, 156, 157, 158, 162, 163

[56] References Cited

U.S. PATENT DOCUMENTS 2,200,543  5/1940  Dickey et al. .................. 260/205
2,286,795  6/1942  Dickey et al. .................. 260/205
2,328,570  9/1943  McNally et al. ................ 260/196
2,638,478  5/1953  Morrison et al. ............... 260/945

OTHER PUBLICATIONS

Cook et al., Chemical Abstracts, vol. 44, 3877 to 3878, (1950).

Primary Examiner—Floyd D. Higel
Attorney, Agent, or Firm—Joseph G. Kolodny

[57] ABSTRACT

Azo dyes of the formula in which $X_1$ and $X_2$ independently of one another are alkyl, cycloalkyl, alkenyl, aryl or aralkyl, $Y_1$ is hydrogen or alkyl, $Y_2$ is hydrogen, alkyl, alkenyl or aryl or together with $Y_1$ stands for the atoms required to complete a ring, $Z_1$ is hydrogen, alkyl, alkenyl, alkoxy, aryl, aryloxy, alkylmercapto, arylmercapto, halogen, cyano, carbalkoxy or stands for the atoms which together with $Y_1$ form a ring, and $D_1$ is the radical of a heterocyclic azo component such as a thienyl, thiazolyl, benzthiazolyl, pyrazolyl or imidazolyl radical, or is phenyl optionally substituted by alkyl, cycloalkyl, alkoxy, alkenyl, electronegative substituents such as halogen, cyano, nitro or carboxylic acid, alkyl- or phenylsulfone or N-alkyl or N,N-dialkyl-substituted sulfonamido, can be used as image dyes in photographic silver dye-bleach materials, or for dyeing textile materials.

8 Claims, No Drawings

MONOAZO DYES CONTAINING PHOSPHAMIC ACID DIESTER GROUPS

The present invention relates to novel azo dyes, to a process for their preparation and to the use of these compounds as image dyes in photographic silver dye bleach materials.

It is the object of the present invention to provide novel azo dyes for photographic silver dye bleach materials.

It has been found that certain water-insoluble, oil-soluble azo dyes which contain a N-phenylphosphoramic acid diester component give particularly good results when used as image dyes in photographic silver dye bleach materials.

Accordingly, the present invention provides azo dyes of the formula

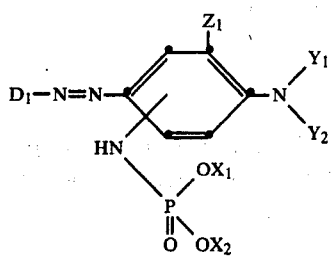

(1)

in which $X_1$ and $X_2$ independently of one another are substituted or unsubstituted alkyl having 1 to 24 carbon atoms, alkenyl having 2 to 4 carbon atoms, substituted or unsubstituted cycloalkyl having 5 or 6 carbon atoms, substituted or unsubstituted aryl or aralkyl having 1 to 4 carbon atoms in the alkyl moiety, $Y_1$ is hydrogen or substituted or unsubstituted alkyl having 1 to 5 carbon atoms, $Y_2$ is hydrogen, substituted or unsubstituted alkyl having 1 to 12 carbon atoms, alkenyl having 2 to 4 carbon atoms or substituted or unsubstituted aryl or together with $Y_1$ stands for the atoms required to complete a substituted or unsubstituted ring, $Z_1$ is hydrogen, substituted or unsubstituted alkyl having 1 to 4 carbon atoms, alkenyl having 2 to 4 carbon atoms, substituted or unsubstituted alkoxy having 1 to 5 carbon atoms, substituted or unsubstituted aryl or aryloxy, substituted or unsubstituted alkylmercapto having 1 to 5 carbon atoms, substituted or unsubstituted arylmercapto, halogen, cyano or carbalkoxy having 2 to 5 carbon atoms, or stands for the atoms which together with $Y_1$ form a substituted or unsubstituted ring and $D_1$ is the radical of a substituted or unsubstituted, homocyclic or heterocyclic, diazo component.

The invention also provides a process for the preparation of the novel azo dyes. This process allows the product of the formula (1) to be obtained in high yield and high purity.

Further, the invention provides the use of the azo dyes according to the invention as image dyes in photographic silver dye bleach materials, the photographic material containing these dyes, its preparation, its use for the production of photographic images, and the images produced therewith.

The invention yet further provides the use of the azo dyes according to the invention for dyeing textile materials and the textile materials dyed therewith.

The substituents $X_1$ and $X_2$, which form part of the ester group, can, independently of one another, be alkyl having 1 to 24 carbon atoms, especially 1 to 18 carbon atoms, which alkyl radicals can be straight-chain or branched and are, for example, methyl, ethyl, propyl, i-propyl, butyl, i-butyl, tert.-butyl, amyl, tert.-amyl (1,1-dimethylpropyl), 1,1,3,3-tetramethylbutyl, 1-methylethylpentyl, hexyl, 1-methylpentyl, neopentyl, 1-, 2- or 3-methylhexyl, heptyl, n-octyl, tert.-octyl, 2-ethylhexyl, n-nonyl, isononyl, tert.-nonyl, decyl, tert.-decyl, undecyl, dodecyl, tetradecyl, hexadecyl or octadecyl, or the corresponding isomers.

The alkyl radicals can be substituted by hydroxyl, alkoxy having 1 to 4 carbon atoms, especially, methoxy, cyano or phenyl. Other suitable substituents are halogen, such as fluorine, chlorine or bromine.

$X_1$ and $X_2$ can also be alkenyl having 2 to 4 carbon atoms, such as ethenyl or propenyl, or substituted or unsubstituted cycloalkyl having 5 or 6 carbon atoms, for example cyclopentyl or cyclohexyl. Where the substituents $X_1$ and $X_2$ are substituted or unsubstituted aralkyl having 1 to 4 carbon atoms in the alkyl moiety, or substituted or unsubstituted aryl, benzyl and phenyl are particularly preferred.

The substituents $Y_1$ can be hydrogen or alkyl having 1 to 5 carbon atoms. The alkyl radicals can be straight-chain or branched and can be, for example, methyl, ethyl, propyl, i-propyl, butyl, i-butyl, tert.-butyl, amyl or tert.-amyl (1,1-dimethylpropyl). Suitable substituents for these radicals are alkoxy having 1 to 4 carbon atoms, especially methoxy and ethoxy, as well as hydroxyl and cyano.

The substituent $Y_2$ in the geminal position to $Y_1$ is hydrogen or alkyl having 1 to 12 carbon atoms, preferably 1 to 8 carbon atoms. The alkyl radicals $Y_2$ can be the same as those given above for $Y_1$; further possibilities are hexyl, 1-methylpentyl, neopentyl, 1-, 2- or 3-methylhexyl, heptyl, n-octyl, tert.-octyl, 2-ethylhexyl, n-nonyl, isononyl, tert.-nonyl, decyl, tert.-decyl, undecyl and dodecyl.

Examples of substituents on the alkyl radicals are hydroxyl, methoxy, phenyl, halogen, such as fluorine, chlorine or bromine, cyano or $U_1$—CO—, in which $U_1$ is hydrogen, alkyl or alkoxy, each having 1 to 6 carbon atoms, or phenyl. The preferred meanings of $U_1$—CO— are formyl, acetyl and benzoyl. Further possible substituents on the alkyl radicals are acyloxy groups, for example

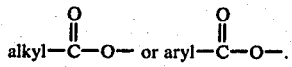

The alkyl radicals in this acyloxy group have 1 to 6, preferably 1 or 2, carbon atoms. Preferred aryl radicals are phenyl which is unsubstituted or substituted by, for example, chlorine, bromine, cyano or nitro.

$Y_2$ can also be alkenyl having 2 to 4 carbon atoms. If the substituent $Y_2$ is aryl, it can be substituted by alkyl or alkoxy, each having 1 to 5 carbon atoms, or chlorine. Preferably, $Y_2$ is phenyl.

The two substituents $Y_1$ and $Y_2$ can, conjointly with the nitrogen atom to which they are bonded, form a 5-membered or 6-membered ring, for example

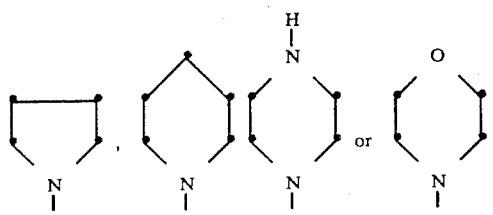

Amongst these, saturated 5-membered rings, such as pyrrolidine radicals, are particularly suitable. The rings can be substituted by, for example, carbalkoxy having 2 to 5 carbon atoms, especially having 2 or 3 carbon atoms.

The substituent $Z_1$ is, for example, alkyl having 1 to 4 carbon atoms or alkoxy having 1 to 5 carbon atoms. The alkyl radicals are the same as those mentioned above for $Y_1$. Suitable alkoxy radicals are those analogous to the alkyl radicals mentioned. Both the alkyl and the alkoxy radicals can be substituted by hydroxyl, halogen, such as chlorine or bromine, methoxy or ethoxy. $Z_1$ can also be alkenyl having 2 to 4 carbon atoms. If $Z_1$ is aryl or aryloxy, especially phenyl or phenoxy, or is alkylmercapto having 1 to 5 carbon atoms, or arylmercapto, especially phenylmercapto, these radicals can be further substituted by hydroxyl, chlorine, cyano, nitro or methoxy. Further, $Z_1$ can be halogen, preferably chlorine or bromine, cyano or carbalkoxy having 2 to 5 carbon atoms, and especially methoxy.

$Z_1$ can also stand for those atoms which together with $Y_1$ form a ring, amongst which 5-membered and especially 6-membered rings are preferred. These rings can contain an oxygen atom as a further hetero-atom. Substituents on these rings can be hydroxyl, methyl, ethyl, methoxy, chlorine, aryl or carbomethoxy, amongst which methyl and ethyl are particularly suitable.

The substituent $D_1$ is the radical of a homocyclic or heterocyclic diazo component and can be, for example, thienyl, thiazolyl, isothiazolyl, 1,2,4-thiadiazolyl, 1,3,4-thiadiazolyl, benzthiazolyl, benzisothiazolyl, pyrazolyl, imidazolyl, 1,2,3-thiazolyl, 1,2,4-triazolyl or phenyl. Any of these systems can carry further substituents on one or more of its carbon atoms and on one or more of its nitrogen atoms, such substituents being alkyl or alkoxy, each having 1 to 4 carbon atoms, cycloalkyl having 5 or 6 carbon atoms, phenyl, electronegative groups such as halogen, especially chlorine or bromine, trifluoromethyl, cyano, nitro, (carboxylic acid) acyl, acetyl, benzoyl, carbalkoxy having 2 to 5 carbon atoms, especially carbomethoxy or carbethoxy, carbalkoxyethoxy having 1 to 4 carbon atoms in the alkoxy moiety, alkylsulfone having 1 to 5 carbon atoms, phenylsulfone, N-alkyl-substituted or N,N-dialkyl-substituted sulfonamido, in which each alkyl moiety has 1 to 4 carbon atoms and can be methoxy-substituted, or cyano-substituted and/or carbethoxy-substituted alkenyl having 2 to 4 carbon atoms, preferably vinyl. 2 adjacent substituents of the said ring systems, preferably a para-substituent and a meta-substituent, can together form an additional fused ring, for example a saturated 5-membered ring, a phenyl ring or a cyclic imide, in which the nitrogen atom can be substituted by alkoxyalkyl having 1 to 4 carbon atoms in the alkoxy moiety and 1 to 4 carbon atoms in the alkyl moiety.

The preferred meaning of $D_1$ is phenyl, which is substituted by at most 4 substituents, which can be identical or different, from the list given above. Amongst those listed, the electronegative substituents are preferred. These can be cyano, nitro, chlorine, trifluoromethyl, bromine, acetyl, benzoyl, carbomethoxy, carbethoxy, methoxy, ethoxy or cyano- and/or carbethoxy-substituted vinyl, though methyl or ethyl are also possible substituents. The electronegative substituents preferably occupy the ortho- and para-positions in the phenyl ring.

Preferred azo dyes are those of the formula

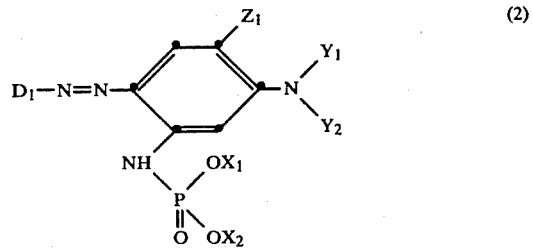

in which $X_1$, $X_2$, $Y_1$, $Y_2$, $Z_1$ and $D_1$ are as defined above.

Useful azo dyes of the formula (2) are those of the formula

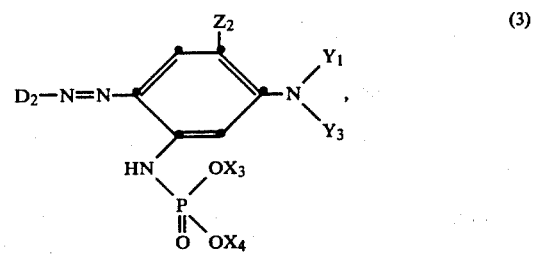

in which $X_3$ and $X_4$ independently of one another are alkyl, having 1 to 18 carbon atoms, which is unsubstituted or substituted by hydroxyl, alkoxy having 1 to 4 carbon atoms, cyano, fluorine, chlorine or bromine, or are alkenyl having 2 to 4 carbon atoms, cycloalkyl having 5 or 6 carbon atoms, aryl or aralkyl having 1 to 4 carbon atoms in the alkyl moiety, $Y_3$ is hydrogen, substituted or unsubstituted alkyl having 1 to 8 carbon atoms, alkenyl having 2 to 4 carbon atoms or substituted or unsubstituted aryl or together with $Y_1$ stands for the atoms required to complete a substituted or unsubstituted 5-membered or 6-membered ring, $Z_2$ is hydrogen, substituted or unsubstituted alkyl having 1 to 4 carbon atoms, substituted or unsubstituted alkoxy having 1 to 5 carbon atoms, aryl, aryloxy, alkylmercapto having 1 to 5 carbon atoms, halogen, cyano or carbalkoxy having 2 to 5 carbon atoms or stands for the atoms which together with $Y_1$ form a substituted or unsubstituted 5-membered or 6-membered ring, $D_2$ is the radical of a substituted or unsubstituted homocyclic or heterocyclic mononuclear or binuclear diazo component and $Y_1$ is as defined above.

Particularly suitable compounds of the formula (3) are those of the formula

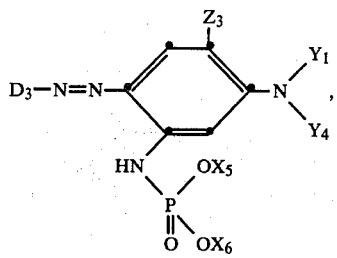

(4)

in which $X_5$ and $X_6$ independently of one another are alkyl having 1 to 12 carbon atoms, which is unsubstituted or substituted by hydroxyl, methoxy, ethoxy, cyano, fluorine, chlorine, or bromine, or are phenyl or benzyl, $Y_4$ is hydrogen, substituted or unsubstituted alkyl having 1 to 8 carbon atoms or substituted or unsubstituted aryl or, together with $Y_1$, stands for the atoms required to complete a substituted or unsubstituted saturated 5-membered ring, $Z_3$ is hydrogen, substituted or unsubstituted alkyl having 1 to 4 carbon atoms, substituted or unsubstituted alkoxy having 1 to 5 carbon atoms, halogen, cyano or carbalkoxy having 2 to 5 carbon atoms or stands for the atoms which together with $Y_1$ form a substituted or unsubstituted 5-membered or 6-membered ring which can contain a further heteroatom, $D_3$ is substituted or unsubstituted thienyl, thiazolyl, isothiazolyl, 1,2,4-thiadiazolyl, 1,3,4-thiadiazolyl, benzthiazolyl, benzisothiazolyl, pyrazolyl, imidazolyl, 1,2,3-triazolyl or 1,2,4-triazolyl or substituted or unsubstituted phenyl and $Y_1$ is as defined above.

Other preferred compounds are those of the formula

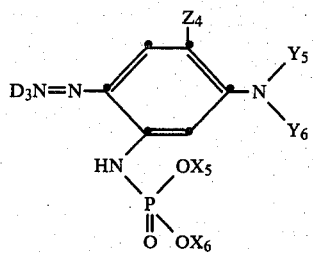

(5)

in which $Y_5$ is hydrogen or alkyl having 1 to 5 carbon atoms which is unsubstituted or substituted by alkoxy having 1 to 4 carbon atoms, $Y_6$ is hydrogen or alkyl having 1 to 8 carbon atoms which is unsubstituted or substituted by methoxy, phenyl, hydroxyl, fluorine, chlorine, bromine, carbalkoxy having 1 to 6 carbon atoms in the alkoxy moiety, acyloxy having 2 to 7 carbon atoms or cyano, or is aryl substituted by alkyl or alkoxy each having 1 to 5 carbon atoms, or by chlorine, or $Y_5$ together with $Y_1$ stands for the atoms required to complete a substituted or unsubstituted saturated 5-membered ring, $Z_4$ is hydrogen, alkyl or alkoxy each having 1 to 4 carbon atoms, or alkoxy having 1 or 2 carbon atoms which is substituted by methoxy or ethoxy, or $Z_4$ is chlorine, bromine, cyano or carbalkoxy having 2 to 5 carbon atoms, or stands for the atoms which together with $Y_1$ form a methyl-substituted saturated 6-membered ring which can contain an oxygen atom as a further hetero-atom, and $X_5$, $X_6$ and $D_3$ are as defined above.

Further compounds of interest are those of the formula

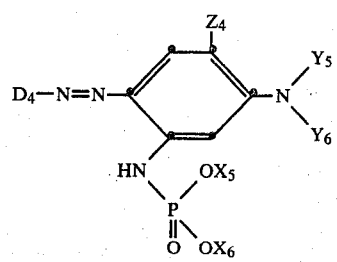

(6)

in which $D_4$ is thiadiazolyl which can be substituted by chlorine or phenyl or imidazolyl which can be substituted by cyano, and in which at least one of the nitrogen atoms can be substituted by $-C_2H_4OC_6H_5$; or is benzthiazolyl or benzisothiazolyl which can both be substituted by nitro groups, or thienyl which can be substituted by methyl and/or carbethoxy groups, or is substituted or unsubstituted phenyl, and $X_5$, $X_6$, $Y_5$, $Y_6$ and $Z_4$ are as defined above.

Preferred compounds of the formula (6) are those of the formula

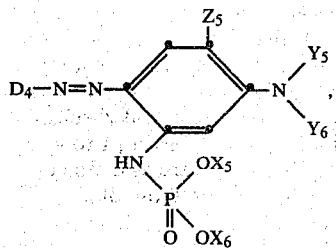

(7)

in which $Z_5$ is hydrogen, alkyl or alkoxy each having 1 to 4 carbon atoms or $-OC_2H_4OCH_3$, or stands for the atoms which together with $Y_5$ form a saturated 6-membered ring which can contain an oxygen atom as a further hetero-atom, and $X_5$, $X_6$, $Y_5$, $Y_6$ and $D_4$ are as defined above.

Particularly suitable compounds are those of the formula

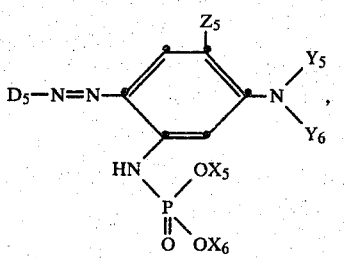

(8)

in which $D_5$ is substituted or unsubstituted phenyl and $X_5$, $X_6$, $Y_5$, $Y_6$ and $Z_5$ are as defined above.

Amongst these, compounds of particular interest are those of the formula

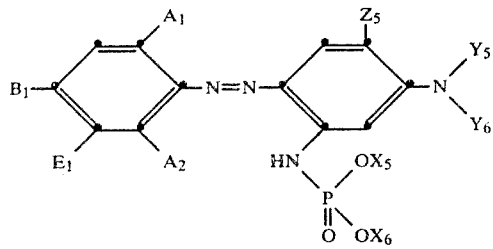

in which $A_1$ and $A_2$ independently of one another are hydrogen, substituted or unsubstituted alkyl having 1 to 4 carbon atoms or an electronegative group, $B_1$ is hydrogen, substituted or unsubstituted alkyl having 1 to 4 carbon atoms, cycloalkyl having 5 or 6 carbon atoms, alkoxy having 1 or 2 carbon atoms, alkoxyethyl having 1 to 6 carbon atoms in the alkoxy moiety, substituted or unsubstituted alkenyl having 2 to 4 carbon atoms or $T_1-CO-$, in which $T_1$ is substituted or unsubstituted alkyl having 1 to 4 carbon atoms or substituted or unsubstituted phenyl, or $B_1$ is carbalkoxy having 2 to 5 carbon atoms, alkylsulfone having 1 to 6 carbon atoms, phenylsulfone, in which the phenyl moiety can be methyl-substituted, N-alkyl-substituted or N,N-dialkyl-substituted sulfonamido, in which each alkyl moiety has 1 to 4 carbon atoms and can be methoxy-substituted, cyano, nitro or halogen, $E_1$ is hydrogen, alkyl having 1 to 4 carbon atoms or an electronegative group or stands for the atoms which together with $B_1$ form a saturated 5-membered or 6-membered ring or a cyclic imide, in which the nitrogen atom can be alkoxyalkyl-substituted, the alkoxy and alkyl moities each having 1 to 4 carbon atoms, and $X_5$, $X_6$, $Y_5$, $Y_6$ and $Z_5$ are as defined above.

Further suitable compounds are those of the formula

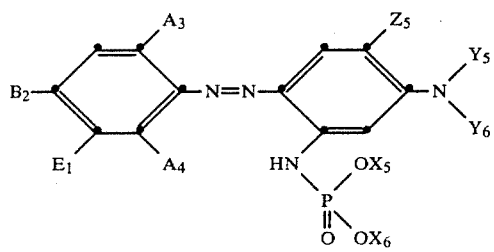

in which $A_3$ and $A_4$ independently of one another are hydrogen, alkyl having 1 to 4 carbon atoms, carbalkoxy having 2 to 5 carbon atoms, carbalkoxyethoxy having 1 to 4 carbon atoms in the alkoxy moiety, trifluoromethyl, cyano, nitro, alkylsulfone having 1 to 5 carbon atoms or halogen, $B_2$ is hydrogen or alkyl having 1 to 4 carbon atoms which can be substituted by electronegative groups, or is alkoxy having 1 or 2 carbon atoms or is alkenyl having 2 to 4 carbon atoms which can be substituted by electronegative groups, or is $T_2-CO-$, in which $T_2$ is methyl or phenyl, or $B_2$ is carbalkoxy having 2 to 5 carbon atoms, alkylsulfone having 1 to 6 carbon atoms, phenylsulfone, N-alkyl-substituted or N,N-dialkyl-substituted sulfonamido, in which each alkyl moiety has 1 or 2 carbon atoms and can be methoxy-substituted, cyano, nitro or halogen, and $X_5$, $X_6$, $Y_5$, $Y_6$, $Z_5$ and $E_1$ are as defined above.

Particularly suitable compounds are those of the formula

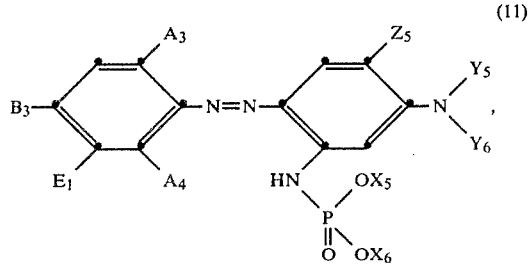

in which $B_3$ is hydrogen or alkyl having 1 to 4 carbon atoms which can be substituted by cyano and/or carbethoxy, or is alkenyl having 2 to 4 carbon atoms which can be substituted by cyano and/or carbethoxy, or is acetyl, benzoyl, cyano, nitro, halogen, alkylsulfone having 1 to 6 carbon aatoms or N-alkyl-substituted or N,N-dialkyl-substituted sulfonamido in which each alkyl moiety has 1 or 2 carbon atoms, and $X_5$, $X_6$, $Y_5$, $Y_6$, $Z_5$, $A_3$, $A_4$ and $E_1$ are as defined above.

Preferred compounds of the formula (11) are those of the formula

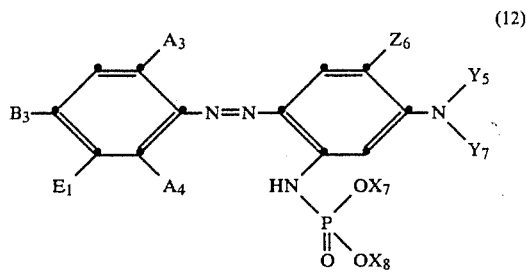

in which $X_7$ and $X_8$ have the same meaning and each is alkyl having 1 to 12 carbon atoms, substituted by hydroxyl, methoxy, ethoxy, cyano or chlorine, or is phenyl or benzyl, $Y_7$ is hydrogen or alkyl having 1 to 6 carbon atoms which can be substituted by methoxy, phenyl, cyano, hydroxyl, chlorine, carbethoxy, acetoxy or benzoyloxy, or is phenyl, $Z_6$ is hydrogen, alkyl having 1 to 4 carbon atoms or alkoxy having 1 to 4 carbon atoms and $Y_5$, $A_3$, $A_4$, $B_3$ and $E_1$ are as defined above.

Further useful compounds are those of the formula

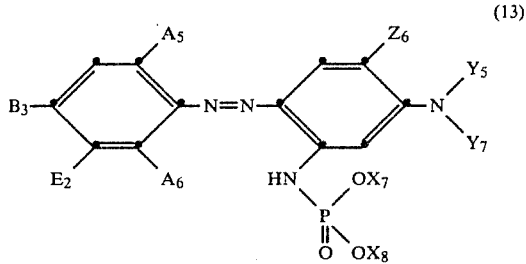

in which $A_5$ and $A_6$ are hydrogen, methyl, trifluoromethyl, cyano, nitro or halogen, $E_2$ is hydrogen, methyl, carbalkoxy having 2 to 5 carbon atoms, trifluoromethyl, nitro or chlorine and $X_7$, $X_8$, $Y_5$, $Y_7$, $Z_6$ and $B_3$ are as defined above.

Particularly preferred compounds are those of the formula

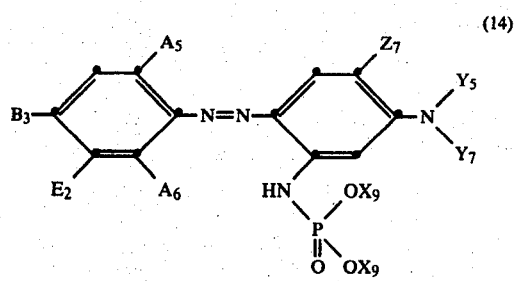
(14)

in which $X_9$ is alkyl having 1 to 12 carbon atoms, $Z_7$ is hydrogen or alkoxy having 1 to 4 carbon atoms and $Y_5$, $Y_7$, $A_5$, $A_6$ and $B_3$ are as defined above.

Amongst these, particularly preferred compounds are those of the formula

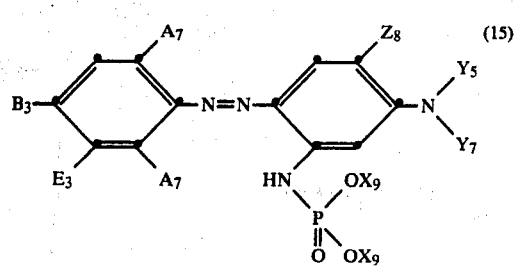
(15)

in which $Z_8$ is hydrogen or methoxy, $A_7$ is cyano, nitro or bromine, $E_3$ is hydrogen, carbomethoxy or methyl and $X_9$, $Y_5$, $Y_7$ and $B_3$ are as defined above.

The most preferred compounds are those of the formula

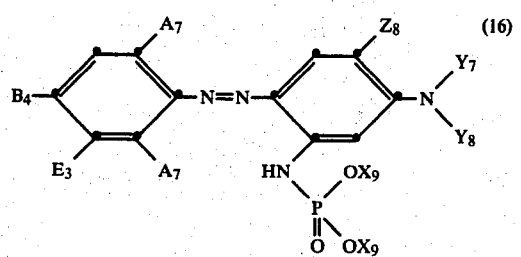
(16)

in which $Y_8$ is hydrogen or alkyl having 1 to 4 carbon atoms, $B_4$ is hydrogen, alkyl having 1 or 2 carbon atoms, cyano- and/or carbethoxy-substituted vinyl, acetyl, benzoyl, cyano, nitro or halogen and $X_9$, $Y_7$, $Z_8$, $A_7$ and $E_3$ are as defined above.

The compounds of the formula (1), in which $X_1$, $X_2$, $Y_1$, $Y_2$, $Z_1$ and $D_1$ are as defined above, are prepared by coupling a compound of the formula $$D_1-N_2^\oplus X^\ominus \quad (17)$$

in which $D_1$ is as defined above and $X^\ominus$ is an anion, with a N-phenylphosphoramic acid diester of the formula

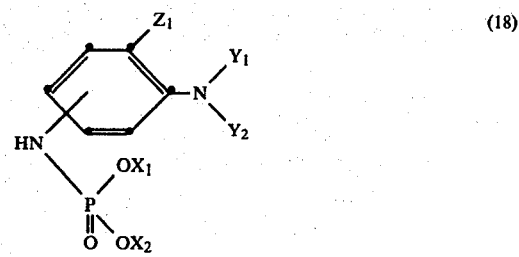
(18)

in which $X_1$, $X_2$, $Y_1$, $Y_2$ and $Z_1$ are as defined above, in an acidic or neutral medium.

N-Phenylphosphoramic acid diesters of the formula (18) are prepared by reacting an amine of the formula

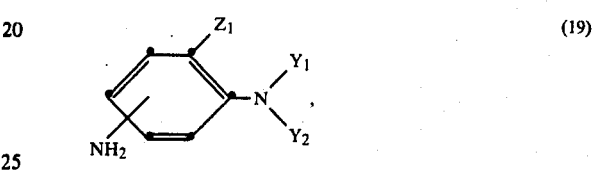
(19)

in which $Y_1$, $Y_2$ and $Z_1$ are as defined above, with a phosphoric acid ester-chloride of the formula

(20)

in the presence of a base, or with a phosphite of the formula

(21)

in which $X_1$ and $X_2$ are as defined above, in the presence of a base and of carbon tetrachloride. The last-mentioned method of preparation is preferred.

Examples of suitable phosphites of the formula (21) are dimethyl phosphite, diethyl phosphite, diisopropyl phosphite, dibutyl phosphite, phenyl dodecyl phosphite, phenyl neopentyl phosphite, diethyl phosphite, bis(2-ethyl-hexyl) phosphite, diphenyl phosphite, 2-ethylhexyl nonylphenyl phosphite, ethyl isopropyl phosphite, 2,2'-dichloroethyl phosphite, bis-(2-isopropyl-S-methyl-phenyl) phosphite, ethyl 2-isopropyl-5-methyl-phenyl phosphite, dibenzyl phosphite and ethyl methyl phosphite.

Examples of suitable chlorides of the formula (20) are phosphoric acid diethyl ester chloride, phosphoric acid dimethyl ester chloride, phosphoric acid dipropyl ester chloride and phosphoric acid bis-(2,2,2-trifluoroethyl) ester chloride.

Examples of N-phenylphosphoramic acid diesters of the formula (17) are:

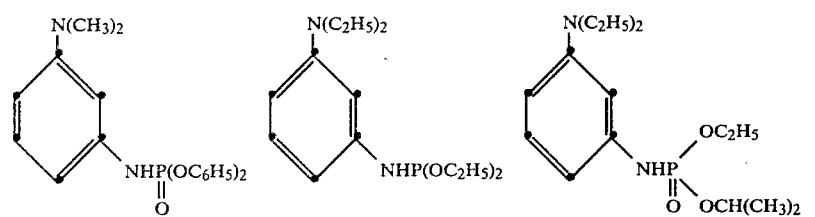
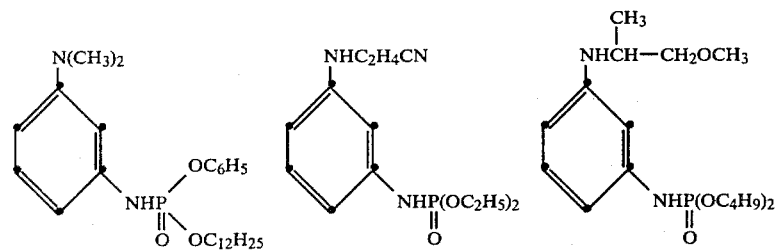
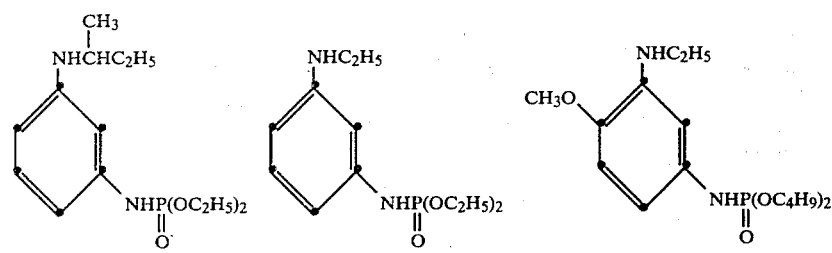
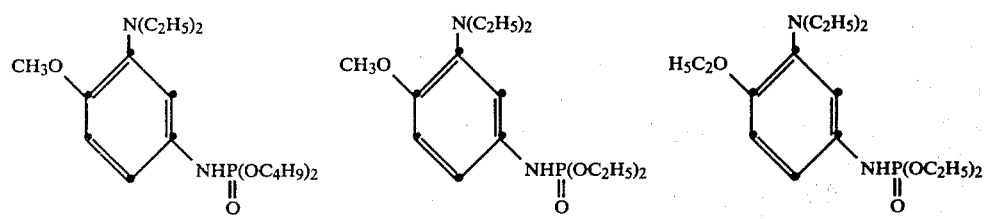
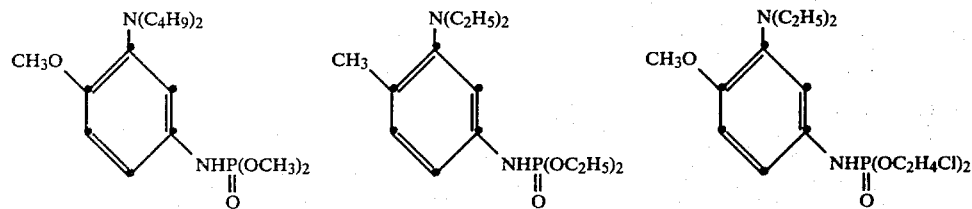
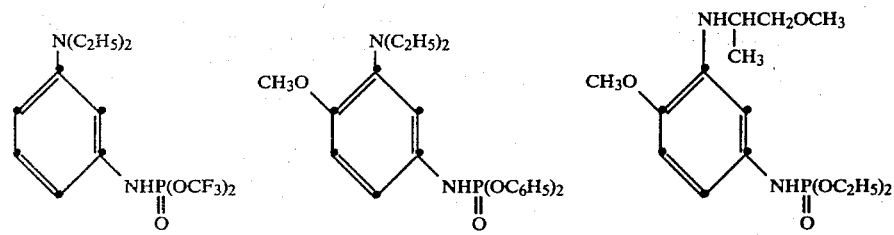
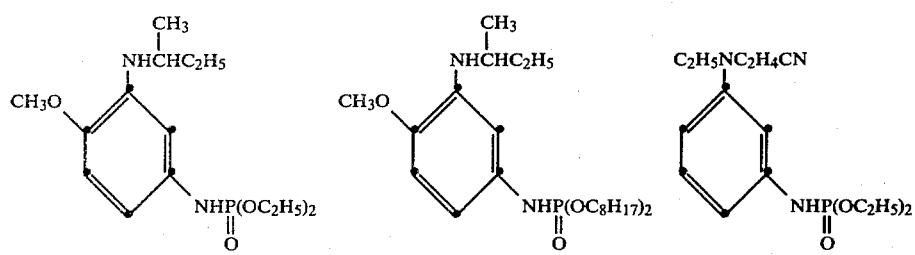

-continued

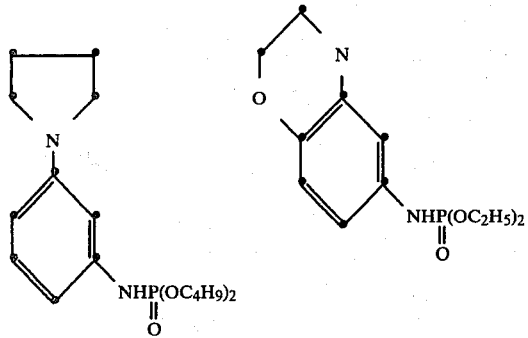

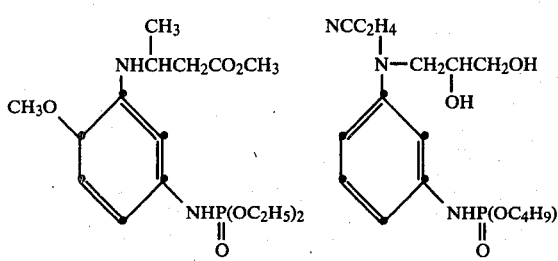

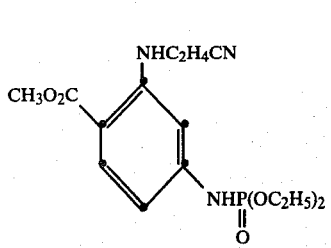

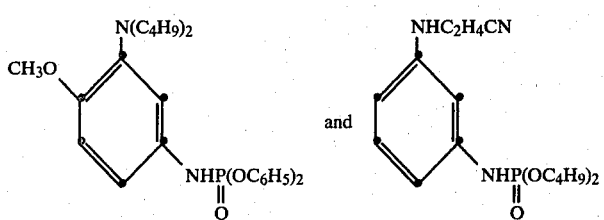

The radicals $D_1$ of the formula (17) are in the main derived from the benzene series of heterocyclic series, for example the thiophene, thiazole, thiadiazole, benzthiazole, benzisothiazole, triazole, pyrazole or indazole series. Specific examples of compounds from which $D_1$ is derived are: aniline, o-, m- and p-toluidine, o-, m- and p-methylsulfonylaniline, p-aminophenyl hexyl sulfide, o-, m- and p-nitroaniline, o-, m- and p-cyanoaniline, o-, m- and p-chloroaniline, o-, m- and p-bromoaniline, o-, m- and p-trifluoromethylaniline, 2,4- and 2,6-dibromoaniline, 2,6-dibromo-4-chloroaniline, 4-amino-3,5-dibromotoluene, 2,6-dibromo-4-ethylaniline, ethyl, butyl and t-butyl 3-[4'-amino-3',5'-dibromophenyl]-2-cyanoacrylate, 3-[4'-amino-3',5'-dibromophenyl]-2-cyanoacrylonitrile, ethyl 4-amino-3,5-dibromophenylacrylate, 3,4-dichloroaniline, 2,5-dichloroaniline, 3,5-dichloroaniline, 2,4,5-trichloroaniline, 2,4,6-trichloroaniline, 2,4,6-tribromoaniline, 2,4-dicyanoaniline, 2,5-dicyanoaniline, 2,6-dicyanoaniline, 2-cyano-4-chloroaniline, 2-cyano-4-chloro-6-bromoaniline, 2,4-dicyano-6-chloroaniline, 2-chloro-4-cyanoaniline, 2-trifluoromethyl-4-chloroaniline, 2-nitro-4-chloroaniline, 2-nitro-4-methylaniline, 2-methyl-4-nitroaniline, 2-chloro-4-nitroaniline, 2-bromo-4-nitroaniline, 2-trifluoromethyl-4-nitroaniline, 2-trifluoromethyl-4-nitro-6-bromoaniline, 2-trifluoromethyl-4-nitro-6-cyanoaniline, 2,5-dichloro-4-nitroaniline, 2,6-dichloro-4-nitroaniline, 4-amino-3,5-dibromobenzenesulfonic acid, 4-amino-3,5-dibromophenyl hexyl-sulfone, 4-amino-3,5-dibromobenzaldehyde, 4-amino-3,5-dibromoacetophenone, ethyl 4-amino-cinnamate, ethyl and methyl 4-amino-hydrocinnamate, ethyl, methyl and 2-methylpentyl 4-amino-3,5-dibromo-cinnamate, 2,6-dibromo-4-methoxyaniline, 2,6-dicyano-3,4-dimethylaniline, 2,4-dicyano-3,6-dimethylaniline, 2,6-dibromo-4-nitroaniline, 2-chloro-4-nitro-6-bromoaniline, 2,6-dichloro-4-cyanoaniline, 2,4-dinitroaniline, 2,4-dinitro-6-chloroaniline, 2,4-dinitro-6-bromoaniline, 2,4-dinitro-6-cyanoaniline, 2,6-dicyano-4-nitroaniline, 2-methylsulfonyl-4-chloroaniline, 2-chloro-4-methylsulfonylaniline, 2-methylsulfonyl-4-nitroaniline, 2-nitro-4-ethylsulfonylaniline, 2,4-dinitro-6-methylsulfonylaniline, 2-cyano-4-methylsulfonylaniline, 2-phenylsulfonyl-=aniline, 2,6-dichloro-4-methylsulfonyl-aniline, 2,6- dibromo-4-methylsulfonylaniline, methyl, ethyl, propyl, butyl, benzyl, phenyl, β-methoxyethyl, β-ethoxyethyl, β-hydroxyethyl and 3,6-dioxa-heptyl o-aminobenzoate, m-aminobenzoate and p-aminobenzoate, diethyl o-aminophenylphosphonate, methyl and methoxyethyl 4-nitroanthranilate, 3- and 4-aminophthalic acid, dimethyl and diethyl 5-aminoisophthalate and aminoterephthalate, 3- and 4-aminobenzoic acid amide, methylamide, n-butylamide and 3'-methoxypropylamide, 2-, 3- and 4-aminobenzoic acid dimethylamide, diethylamide, pyrrolidide, morpholide and N-ethyl-N-β-methoxyethylamide, 5-aminoisophthalic acid diamide and di(methoxypropylamide), aminoterephthalic acid bis-diethylamide, 3- and 4-aminophthalic acid amide, β-hydroxyethylimide and phenylimide, 3-amino-6-nitrophthalic acid β-hydroxyethylimide, 2-, 3- and 4-aminobenzenesulfonic acid N,N-bis-3'-methoxyethylamide, morpholide and N-methylanilide, 1-amino-2-chlorobenzene-4-sulfonic acid dimethylamide, 1-amino-2,5- or -2,6-dichlorobenzene-4-sulfonic acid dimethylamide, 2-, 3- and 4-aminophenyl methylsulfonate 2'-, 3'- and 4'-aminophenyl benzenesulfonate, N-acetyl-p-phenylenediamine, 2- and 4-aminobenzophenone, 4-nitro-1-naphthylamine, 6-nitro-2-naphthylamine, 1-aminoanthraquinone, 1-amino-4-chloroanthraquinone, 1-amino-2-ethoxynaphthalene, 4-amino-naphthalic acid butylimide, 6-amino-5,7-dicyanindane, 4-aminoazobenzene, 2',3-dimethyl-4-aminoazobenzene, 3',2-dimethyl-4-amino-azobenzene, 2-methyl-5-methoxy-4-aminobenzene, 4-amino-2-nitroazobenzene, 2,5-dimethoxy-4-aminoazobenzene, 4'-hydroxy-4-aminoazobenzene, 4'-chloro-4-aminoazobenzene, 2,3'-dichloroaminoazobenzene, 3,5-dibromo-4-amino-azobenzene, 4-aminoazobenzene-4'-sulfonic acid dimethylamide, 2'- and 3'-chloro-4-aminoazobenzene, benzene-azo-4-aminonaphthalene, 5-amino-3-methyl-isothiazole, 3-amino-2,1-benzisothiazole, 3-amino-5-chloro-2,1-benzisothiazole, 3-amino-5-bromo-2,1-benzisothiazole, 3-amino-5-nitro-2,1-benzisothiazole, 3-amino-5-nitro-7-chloro-2,1-benzisothiazole, 3-amino-5-nitro-7-bromo-2,1-benzisothiazole, 3-amino-5,7-dichlorobenzisothiazole, 3-amino-5,7-dibromo-benzisothiazole, 4-amino-7-nitro-1,2-benzisothiazole, 4-amino-5-chloro-7-nitro-1,2-benzisothiazole, 4-amino-5-bromo-7-nitro-1,2-benzisothiazole, 4-amino-5-cyano-7-nitro-1,2-benzisothiazole, 3-amino-2,1-benzisothiazle-5-sulfonic acid N,N-bis-β-methoxyethylamide, 2-aminothiazole, 2-amino-5-nitrothiazole, 2-amino-4-methyl-5-nitrothiazole, 2-amino-4-phenyl-5-nitrothiazole, 2-amino-5-phenyl-1,3,4-thiadiazole, 2-amino-5-ethylmercapto-1,3,4-thiadiazole, 3-phenyl-5-amino-1,2,4-thiadiazole, 3-chloro-5-amino-1,2,4-thiadiazole, 3-β-carbomethoxyethyl-mercapto-5-amino-1,2,4-thiadiazole, 3-methylmercapto-5-amino-1,2,4-thiadiazole, 1-ethyl-2-amino-4,5-dicyano-imidazole, 3-aminopyrazole, 3-amino-4-cyanopyrazole, 2-phenyl-3-amino-4-cyanopyrazole, 3-amino-5-methyl-pyrazole, 3-amino-5-ethyl-pyrazole, 3-amino-5-phenyl-pyrazole, 3-amino-5-benzyl-pyrazole, 3-amino-1,2,4-triazole, 3-amino-5-methyl-1,2,4-triazole, 3-amino-5-ethyl-1,2,4-triazole, 3-amino-5-phenyl-1,2,4-triazole, 3-amino-5-benzyl-1,2,4-triazole, 3-amino-1-phenylpyrazole, 3-aminopyridine, 3-aminoquinoline, 2-aminobenzthiazole, 2-amino-6-methylbenzthiazole, 2-amino-6-methoxybenzthiazole, 2-amino-6-ethoxy-benzylthiazole, 2-amino-6-butoxy-benzthiazole, 2-amino-6-cyanobenzthiazole, 2-amino-6-thiocyanato-benzthiazole, 2-amino-6-nitrobenzthiazole, 2-amino-5,6-dichlorobenzthiazole, 2-amino-6,7-dichlorobenzthiazole, 2-amino-4- and -6-methylsulfonylbenzthiazole, 2-amino-3-nitro-5-methylsulfonylthiophene, 2-amino-3,5-bis-(methylsulfonyl)-thiophene, 2-amino-3,5-dinitrothiophene, 2-amino-3-cyano-5-nitro-thiophene, 2-amino-5-nitrothiophene, triethyl 2-aminothiophene-3,4,5-tricarboxylate, diethyl 2-amino-3-cyanothiophene-4,5-dicarboxylate, o-, m- and p-aminobenzenesulfonic acid, 2',4'-di-tert.-pentylphenyl 4-amino-3,5-dibromobenzenesulfonate, 2-amino-4- and -5-nitrobenzenesulfonic acid, 2-amino-5-acetamido-benzenesulfonic acid, 2-amino-4-benzoylamidobenzenesulfonic acid, 4-aminophenylmethanesulfonic acid, 2- and 4-aminophenylmethylphosphonic acid, 3-amino-naphthalene-1,5-disulfonic acid and 1-aminoanthraquinone-2-sulfonic acid.

The dyes of the formula (1) can be used for diverse purposes. For example, they are useful for printing or dyeing textile materials, such as polyester fabrics or polyester union fabrics, by, for example, the exhaust process, padding process or thermosol process.

The polyester material, especially the textile material, is, for example, made from cellulose ester fibres, such as cellulose 2½-acetate fibres or cellulose triacetate fibres or especially from linear polyester fibres. Linear polyester fibres are to be understood as meaning synthetic fibres which are obtained by condensing, for example, terephthalic acid with ethylene glycol or isophthalic acid or terephthalic acid with 1,4-bis(hydroxymethyl)-cyclohexane, as well as co-condensates of terephthalic acid and isophthalic acid and ethylene glycol. In the textile industry, the linear polyester which has hitherto been employed almost exclusively is derived from terephthalic acid and ethylene glycol.

The fibre materials can also be used in the form of union fabrics, for example produced from mixtures of polyacrylonitrile and polyester, polyamide and polyester, polyester and cotton, polyester and viscose or polyester and wool.

The textile material to be dyed can be in various states of processing. For example, loose material, piece goods, such as knitted fabrics or woven fabrics, or yarn in the form of packages or muffs, can be used.

Dyeing can also be carried out with mixtures of the azo dyes according to the invention.

The azo dyes according to the invention are in particular also suitable for the production of level combination shade dyeings, including dichromic or trichromic dyeing. Trichromic dyeing is in particular to be understood as meaning a triple combination of the primary colours yellow (or orange), red and blue.

The amount of the dyes to be added to the liquor depends on the desired colour strength; in general, amounts of 0.001 to 10, preferably 0.001 to 5, percent by weight, based on textile material employed, have proved suitable.

The liquors (dyeing formulations) can contain known carriers based, for example, on dichlorobenzene or trichlorobenzene, methylbenzene or ethylbenzene, o-phenylphenol, benzylphenol, diphenyl ether, chlorodiphenyl, methyldiphenyl, cyclohexanone, acetophenone, alkylphenoxyethanol, mono-, di- or tri-chlorophenoxyethanol or -phenoxypropanol, pentachlorophenoxyethanol, alkylphenyl benzoates or, in particular, diphenyl, methyldiphenyl ether, dibenzyl ether, methyl benzoate, butyl benzoate or phenyl benzoate. The carriers are preferably used in an amount of 0.5 g to 2 g/liter of liquor or 10 to 60 percent by weight, based on the assistant formulation.

Depending on the textile material to be treated, the dyebaths can, in addition to the dyes and the assistants according to the invention, also contain oligomer inhibitors, antifoaming agents, anti-wrinkle agents and, preferably, dispersants.

The dispersants serve in particular to achieve efficient fine dispersion of the disperse dyes. The dispersants generally used when dyeing with disperse dyes can be employed. Examples of suitable dispersants are anionic surfactants, which may be present alone or as mixtures.

Anionic dispersants which have proved particularly advantageous are ligninsulfonates, polyphosphates and, preferably, formaldehyde condensation products obtained from aromatic sulfonic acids and formaldehyde, with or without monofunctional or bifunctional phenols, for example those obtained from cresol, β-naphtholsulfonic acid and formaldehyde, from benzenesulfonic acid, formaldehyde and naphthalenesulfonic acid, from naphthalenesulfonic acid and formaldehyde or from naphthalenesulfonic acid, dihydroxydiphenyl sulfone and formaldehyde.

The disodium salt of di-(6-sulfonaphth-2-yl)-methane is preferred.

Mixtures of anionic dispersants can also be employed. Normally, the anionic dispersants are present in the form of their alkali metal salts, ammonium salts or amine salts.

These dispersants are preferably used in an amount of 0.1 to 5 g/l of liquor.

Dyeing is advantageously carried out from an aqueous liquor, by the exhaust method. The liquor ratio can accordingly be chosen within a wide range, for example from 4:1 to 100:1, preferably from 10:1 to 50:1. The dyeing temperature is at least 70° C. and is as a rule no higher than 140° C. Preferably, it is within the range from 80° to 135° C.

Thermofixing, when using a dyeing liquor containing an azo dye according to the invention, is carried out in a temperature range of 100° to 220° C., after the fabric has first been dried at about 100° C.

Linear polyester fibres and cellulose triacetate fibres are preferably dyed by the (so-called) high temperature method in a sealed, and advantageously also pressure-resistant, apparatus at temperatures of at least 100° C. and preferably between 100° and 135° C., if appropriate under pressure. Suitable sealed vessels are, for example, circulatory dyeing apparatuses, such as cheese-dyeing or beam-dyeing apparatuses, winches, jet dyeing or drum-dyeing machinery, muff-dyeing apparatuses, paddle-vats or jiggers.

The azo dyes according to the invention can also be incorporated into the print pastes conventionally used for printing polyester fabrics or polyester union fabrics.

Furthermore, the azo dyes according to the invention ar particularly advantageously suitable for use as image dyes for the silver dye bleach process. Accordingly, valuable photographic materials, in particular silver dye bleach materials, which comprises, on a base, at least one layer containing a dye of the formula (1), can be prepared in a conventional manner known per se.

A transparent, metallically reflecting or, preferably, opaque white material can be used as the base for the silver halide emulsion layer; preferably, the base should not be capable of absorbing liquid from the baths.

The base can consist, for example, of unpigmented or pigmented cellulose triacetate or polyester. Should it consist of paper fibres, it must be lacquered or polyethylene-coated, on both sides. On at least one side of this base are the light-sensitive layers, preferably in the conventional arrangement, i.e. a red-sensitised silver halide emulsion layer, containing a cyan azo dye, as the lowest layer, on top of this a green-sensitised silver halide emulsion layer containing a magenta azo dye, and, as the uppermost layer, a blue-sensitive silver halide emulsion layer containing a yellow azo dye. The material can also contain subbing layers, intermediate layers, filter layers and protective layers, but the total thickness of the layers should as a rule not exceed 20μ.

The dyes according to the invention are lipophilic and are in general incorporated into the gelatins as solutions in high-boiling solvents. In most cases it suffices to add the dyes employed as a solution in such a solvent, with or without the addition of a volatile auxiliary solvent, to an aqueous gelatin solution at normal or slightly elevated temperature, with efficient stirring. The mixture is then brought together with a gelatin which contains silver halide and/or other materials for producing photographic images, cast on a base in a conventional manner to form a layer, and dried if appropriate.

Dyes of the formula (1), dissolved in organic solvents, can also be added direct to a gelatin which contains silver halide and/or other materials for producing photographic images. Thus, for example, it is possible to add the dye solution only immediately prior to casting Instead of simple stirring, the conventional methods of dispersing by means of kneading forces and/or shearing forces or ultrasonics can also be employed; alternatively, it is possible to use the process of Swiss Patent Application 4503/79-2, without exertion of shearing forces, to form a spontaneous emulsion.

It is also possible to add the dye in a solid form, namely as a fine suspension, instead of as a solution.

Furthermore, it is possible to incorporate the dyes into the gelatin in the presence of high-molecular polymers; latices are particularly useful for this application.

The casting solution can also contain other additives, such as hardeners, sequestering agents and wetting agents, as well as sensitisers and stabilisers for the silver halide.

The dyes of the formula (1) do not undergo any chemical reactions with the light-sensitive materials. They are very diffusion-resistant, because they form stable, organic solutions. They are insensitive to calcium ions and easily dischargeable to white.

On addition to the casting solutions, the dyes produce neither an increase in viscosity nor a significant change in viscosity when the casting mixture is left to stand.

The spectral absorptions in gelatin are such that the dyes of the formula (1) can, if appropriate structures are chosen, be combined to form a dye tripack, composed of one yellow dye, one magenta dye and one cyan dye, the tripack showing grey shades, appearing neutral to the eye, over the entire density range.

The photographic silver dye bleach material produced with dyes of the formula (1) is in particular distinguished by brilliant colours, good colour reproduction and excellent light-fastness. An important characteristic of a good colour-copying material is excellent tone rendition and balanced colour gradations in all density ranges. The control of the colour equilibrium, in particular, repeatedly presents difficulties, since different bleaching characteristics of the azo dyes cannot always be compensated by the conventional methods of building up the material, such as balancing the sensitivity and contrast of the silver emulsions employed. This in many cases restricts the choice of the image dyes, and in particular also the choice of processing components in the bleaching bath.

In general, the exposed silver dye bleach materials are processed in four successive steps:
1. silver development
2. dye bleaching
3. silver bleaching
4. fixing In the first step, the latent silver image formed on exposure is developed. In the second step, the image dye allotted to the silver is bleached, in accordance with the existing image-wise distribution of the silver. The third step is necessary in order to re-oxidise the excess image silver still present after dye bleaching. In the fourth step, the silver, which is now entirely present in the form of halides, is removed by dissolving out with a complexing agent, especially a salt of thiosulfuric acid, in order to make the finished image insensitive to additional exposure and to free the pure colour image from cloudiness.

The second process step, namely dye bleaching, is carried out, in the conventional known processes, in a strongly acid medium, a catalyst being added to accelerate the dye bleaching. The bleaching baths additionally contain a silver complexing agent or ligand. Both the constituents, namely catalyst and ligand, are necessary in order to transmit the reducing action of the metallic, non-diffusible image silver to the equally non-diffusible dye. The reduced form of the catalyst, which is formed by reduction at the image silver, here serves as an intermediate carrier, which, after travelling a certain diffusion distance, irreversibly reduces, and thereby bleaches, the dye, and is at the same time itself re-oxidised to the original form.

The ability of the reduced stage of the bleaching catalyst to diffuse freely between the image silver and the dye to be bleached makes it possible spatially to separate the silver and the image dye to a certain degree, i.e. the bleachable dye and the corresponding silver halide emulsion need not be present in the same layer but can be in adjacent layers, or need only partially be present in the same layer. Such silver dye bleach materials are described, for example, in German Pat. No. 2,036,918, German Pat. No. 2,132,835 and German Pat. No. 2,132,836.

A simplification of the processing method, in which the dye bleaching and silver bleaching are combined in a single process step, has been described in German Pat. No. 2,488,433.

The combined dye bleach and silver bleach baths (i.e. the formulations) for processing the exposed silver dye bleach material contain components (a) to (e) below, with or without component (f): (a) strong acid, (b) water-soluble iodide, (c) water-soluble oxidising agent, (d) antioxidant, (e) bleaching catalyst and (f) bleaching accelerator.

The amount of the bleaching catalysts which are employed in the—preferably aqueous—processing baths can vary within wide limits and is about 0.05 to 10 g/l of bleaching bath.

The temperature of the bleaching bath is in general between 20° and 90° C., preferably between 20° and 60° C.; of course, the requisite processing time is less at a higher temperature than at a lower temperature. The bleaching baths are stable within the stated temperature range. In general, the aqueous bleaching formulations required for the processing operation are employed in the form of dilute aqueous solutions, containing the stated components. Other methods, for example use of the formulation in paste form, are however also conceivable.

The stated temperature range also applies to the other processing steps. The aqueous bleaching formulation according to the present invention can be prepared, for example, from liquid, in particular aqueous, concentrates of some or all components ((a) to (f)). It is advantageous to use, for example, two liquid concentrates, of which one contains the strong acid (a) and the oxidising agent (c) and the other contains the remaining components (b), (d) and (e), with or without (f); in the latter concentrate, an additional solvent, such as ethyl alcohol, propyl alcohol, benzyl alcohol, ethylene glycol methyl ether or ethylene glycol ethyl ether, can be added to improve the solubility, especially of component (e).

The aqueous bleaching formulations used as a rule contain components (a) to (f) in the following amounts:
(a) strong acid: 10 to 200 g/l;
(b) water-soluble iodide: 2 to 50 g/l, preferably 5 to 25 g/l;
(c) water-soluble oxidising agent: 1 to 30 g/l;
(d) antioxidant: 0.5 to 10 g/l;
(e) bleaching catalysts: 0.05 to 10 g/l, with or without
(f) bleaching accelerator: 1 to 5 g/l.

Strong acids (component (a)) which can be present in the combined dye bleaching and silver bleaching baths are alkylsulfonic acids or arylsulfonic acids, and especially p-toluenesulfonic acid, as well as sulfuric acid, sulfamic acid or trichloroacetic acid. Mixtures of these acids can also be employed. The pH value of the bleaching bath is as a rule not greater than 2 and preferably not greater than 1.

The water-soluble iodides (component (b)) are as a rule alkali metal iodides, especially sodium iodide and potassium iodide.

The oxidising agents (c) employed are advantageously water-soluble aromatic mononitro and dinitro compounds and anthraquinonesulfonic acid derivatives. The use of such oxidising agents serves to influence the colour equilibrium and the contrast of the images produced by the dye bleach process and is known from German Patent 735,672, British Pat. Nos. 539,190 and 539,509 and Japanese patent publication No. 22673/69.

The mononitro and dinitro compounds are preferably mononitrobenzenesulfonic acids or dinitrobenzenesulfonic acids, for example those of the formula

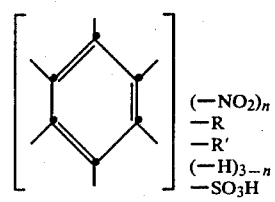

(22)

$(-NO_2)_n$
$-R$
$-R'$
$(-H)_{3-n}$
$-SO_3H$ in which n is 1 or 2 and R and R' are hydrogen, lower alkyl having 1 to 4 carbon atoms, alkoxy, hydroxyl, amino or halogen (chlorine or bromine). The sulfonic acids can be added as readily soluble salts. Examples of suitable salts are the sodium or potassium salts of the following acids: o-nitrobenzenesulfonic acid, m-nitrobenzenesulfonic acid, 2,4-dinitrobenzenesulfonic acid, 3,5-dinitrobenzenesulfonic acid, 3-nitro-4-chlorobenzenesulfonic acid, 2-chloro-5-nitrobenzenesulfonic acid, 4-methyl-3,5-dinitrobenzenesulfonic acid, 3-chloro-2,5-dinitrobenzenesulfonic acid, 2-amino-4-nitrobenzenesulfonic acid, 2-amino-4-nitro-5-methoxybenzenesulfonic acid and 4-nitrophenol-2-sulfonic acid.

The compounds constituting component (c) serve not only as silver bleaching agents but also to produce a flatter gradation.

The antioxidants (anti-corrosion agents (d)) used are advantageously reductones or water-soluble mercapto compounds. Suitable reductones are, in particular, acireductones which have a 3-carbonylene-1,2-diol grouping, such as reductin, triose-reductone or, preferably, ascorbic acid. Examples of suitable mercapto compounds include thioglycerol, but especially and compounds of the formula $$HS-C_qH_{2q}-B \tag{23}$$

or preferably $$HS-(CH_2)_m-COOH \tag{24}$$

in which q is an integer from 2 to 12, B is a sulfonic acid group or carboxylic acid group and m is 3 or 4. Mercapto compounds which can be used as antioxidants are described in German Pat. Nos. 2,258,076 and 2,423,814. Other suitable antioxidants are adducts of alkali metal bisulfites, alkaline earth metal bisulfites or ammonium bisulfites with organic carbonyl compounds, preferably adducts of alkali metal bisulfites or ammonium bisulfites with monoaldehydes having 1 to 4 carbon atoms or dialdehydes having 2 to 5 carbon atoms (German Pat. No. 2,737,142).

Examples include the formaldehyde-bisulfite adduct, which is particularly preferred, and also the corresponding adducts of acetaldehyde, propionaldehyde, butyraldehyde, isobutyraldehyde, glyoxal, malonodialdehyde or glutarodialdehyde. In some cases, the tertiary water-soluble phosphines referred to later as bleaching accelerators can at the same time serve as antioxidants.

Examples of suitable bleaching accelerators (f) are quaternary ammonium salts, such as are known from German Pat. Nos. 2,139,401 and 2,716,136. Preferably, they are quaternary, substituted or unsubstituted piperidine, piperazine, pyrazine, quinoline or pyridine compounds, the last-mentioned being preferred. Tetraalkylammonium compounds (alkyl having 1 to 4 carbon atoms) and alkylenediammonium compounds (alkylene having 2 to 6 carbon atoms) may also be used. Specific examples are: tetraethylammonium iodide; $(CH_3)_3N^\oplus(CH_2)_2N^\oplus(CH_3)_3.2I^\ominus$; $(CH_3)_3N^\oplus(CH_2)_6N^\oplus(CH_3)_3.2I^\ominus$; N-methylpyridinium iodide; N-methylquinolinium iodide; N-hydroxyethylpyridinium chloride; N-hydroxypropylpyridinium bromide; N-methyl-2-hydroxymethylpyridinium iodide; N,N-dimethylpiperidinium iodide; N,N'-dimethylpyrazinium fluosulfate and γ-picolinium bisulate.

Other bleaching accelerators are the water-soluble tertiary phosphines known from German Offenlegungsschrift 2,651,969, which preferably contain at least one cyanoethyl grouping. They have, for example, the formula

(25)

in which W is $-C_rH_{2r}CN$, $-C_rH_{2r}NO_2$ or a substituted or unsubstituted aryl radical or a heterocyclic radical, r is from 1 to 25, X is unsubstituted or substituted alkyl and Y is hydroxyalkyl, alkoxyalkyl, sulfoalkyl or aminoalkyl (alkyl in each case having 1 to 25, preferably 2 to 4, carbon atoms), phenyl, sulfophenyl or pyridyl. Preferred tertiary phosphines have the formula

(26)

in which $X_1$ is $-CH_2CH_2CN$ or $-(CH_2)_2OCH_3$, $Y_1$ is $-(CH_2)_2SO_3^\ominus M^\oplus$, $-(CH_2)_3-SO_3^\ominus M^\oplus$, $-(CH_2)_4-SO_3^\ominus M^\oplus$, $-(CH_2)_2OCH_3$ or $-CH_2N(C_2H_5)_2$, $W_1$ is $-CH_2CH_2CN$ or phenyl and M;hu $\oplus$ is a cation, especially an alkali metal cation, for example the sodium or potassium cation.

Specific examples are the following compounds: the sodium salt of bis-(β-cyanoethyl)-2-sulfoethylphosphine, the sodium salt of bis-(β-cyanoethyl)-3-sulfopropylphosphine, the sodium salt of bis-(β-cyanoethyl)-4-sulfobutylphosphine, bis-(β-cyanoethyl)-2-methoxyethylphosphine, bis-(2-methoxyethyl)-(β-cyanoethyl)-phosphine, the sodium salt of (β-cyanoethyl)-phenyl-3-sulfopropylphosphine, (β-cyanoethyl)-phenyl-2-methoxyethylphosphine and bis-(2-methoxyethyl)-phenylphosphine.

All baths can contain additional conventional additives, for example hardeners, wetting agents, fluorescent brighteners or ultraviolet stabilisers.

For the silver development, baths of conventional composition can be employed, for example those which contain hydroquinone as the developer substance, with or without 1-phenyl-3-pyrazolidinone. The silver development bath can also already contain a bleaching catalyst.

The silver fixing bath can be made up in a known conventional manner. The fixing agent used is, for example, sodium thiosulfate or, advantageously, ammonium thiosulfate, if desired together with additives such as sodium bisulfite and/or sodium metabisulfite.

EXAMPLE 1

Preparation of the dye of the formula

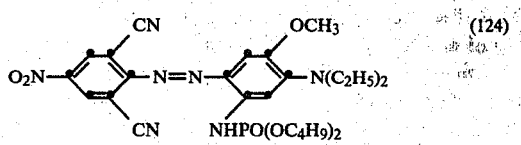

(124)

0.88 g(0.003 mol) of 2,6-dibromo-4-nitro-aniline in 15 ml of dioxane are diazotised at 15° C. with 0.4 g of nitrosylsulfuric acid in the presence of 1 ml of formic acid and 0.5 ml of methanesulfonic acid. 1.05 g of phosphoric acid dibutyl ester 4-methoxy-3-(diethylamino)anilide in 10 ml of dioxane are added. The mixture is diluted with 50 ml of ice water, buffered with sodium acetate and stirred for a further 30 minutes. The precipitate is filtered off with suction and recrystallised from an acetonitrile/water mixture. The reddish violet intermediate of the formula

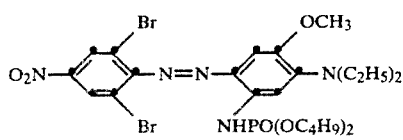

is dissolved in 10 ml of N-methyl-pyrrolidone in the presence of 0.2 g of copper(I) cyanide. The mixture is stirred under nitrogen for 60 minutes and is finally poured into 100 ml of ice water. The precipitate is filtered off with suction and dissolved in methylene chloride. The resulting solution is washed twice with 40% ammonium thiocyanate solution, then once with sodium mercaptopropionate solution, once with sodium bicarbonate solution and finally with water. It is then dried over magnesium sulfate, and the solvent is evaporated off.

The residue is chromatographed on silica gel, elution being carried out with a 19:1 toluene-acetone mixture. The eluate is concentrated and the dye is finally recrystallised from a chloroform/cyclohexane mixture.

0.2 g of a blue dye having the following physical data is obtained: melting point 145°–148° C.; $\lambda_{max}^{CHCl_3}=644$ nm ($\epsilon=91,680$) and $\lambda_{max}^{gel}=646$ nm and 610 nm.

EXAMPLE 2

Preparation of the dye of the formula

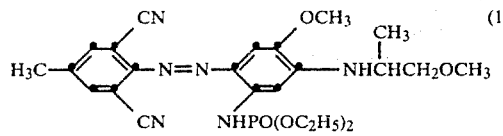

0.8 g (0.003 mol) of 2,6-dibromo-4-methyl-aniline in 20 ml of acetonitrile are diazotised at about 5° C. with 0.4 g of nitrosylsulfuric acid in the presence of 0.3 ml of methanesulfonic acid. 1.04 g of phosphoric acid diethyl ester 4-methoxy-3-[(1-methoxy-2-propyl)-amino]-anilide in 5 ml of acetonitrile are added. The mixture is diluted with 50 ml of ice water, buffered with sodium acetate and stirred for a further 30 minutes. The oily residue is decanted and dissolved in methylene chloride. The organic solution obtained is washed with water and dried over magnesium sulfate. The solvent is evaporated off.

The orange intermediate of the formula

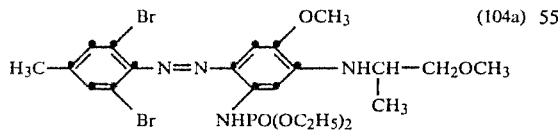

is dissolved in 12 ml of N-methyl-pyrrolidone and 0.4 g of copper(I) cyanide is added. The mixture is stirred under nitrogen for 16 hours and is then poured out into water. The precipitate is filtered off with suction and dissolved in methylene chloride. The resulting solution is washed twice with 40% ammonium thiocyanate solution, then once with sodium mercaptopropionate solution, once with sodium bicarbonate solution and finally with water.

The solution is dried over magnesium sulfate and the solvent is evaporated off.

The residue is chromatographed on a silica gel column, elution being carried out with a 19:1 toluene-acetone mixture. Finally, the dye is recrystallised from acetonitrile.

0.5 g (48%) of a red dye having the following physical data is obtained: melting point 131°–133° C.; $\lambda_{max}^{CHCl_3}=534$ nm ($\epsilon=37,140$) and 557 nm ($\epsilon=38,730$); $\lambda_{max}^{gel}=541$ nm and 560 nm.

EXAMPLE 3

Preparation of the dye of the formula

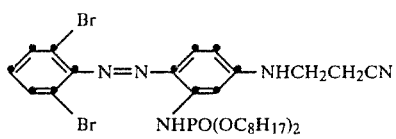

0.75 g (0.003 mol) of 2,6-dibromo-aniline are dissolved in 20 ml of acetonitrile and the solution is cooled to about 5°. 0.40 g of nitrosylsulfuric acid is added and the mixture is stirred for 20 minutes at 5° C. 1.4 g of phosphoric acid dioctyl ester 3-(2-cyanoethylamino)-anilide in 3 ml of acetonitrile and 0.35 ml of acetic acid are then added. The mixture is diluted with 50 ml of ice water, buffered with sodium acetate and stirred for a further 30 minutes at 5° C. The oily residue is separated off and dissolved in methylene chloride. The organic layer obtained is washed with water and dried. The solvent is evaporated and the residue is chromatographed on silica gel, elution being carried out with a 19:1 toluene/acetone mixture.

0.4 g (18%) of an oily, yellow dye having the following physical data is obtained: $\lambda_{max}^{CHCl_3}=389$ nm ($\epsilon=17,170$) and $\lambda_{max}^{gel}=415$ nm ($\epsilon=21,130$).

The further dyes of the formula

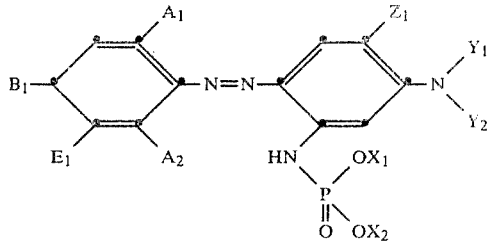

listed in Tables 1 to 3 are prepared analogously.

TABLE 1

| Compound No. | $X_1$ | $X_2$ | $Y_1$ | $Y_2$ | $Z_1$ | $A_2$ | $E_1$ | $B_1$ | $A_1$ | $\lambda_{max}^{CHCl_3}$ | $\epsilon$ mol | $\lambda_{max}^{Gel}$ |
|---|---|---|---|---|---|---|---|---|---|---|---|---|
| 101 | $C_2H_5$ | $C_2H_5$ | H | $CH(CH_3)CH_2OCH_3$ | $OCH_3$ | CN | H | $CH=C(CN)_2$ | CN | 661 | 104200 | 609 |
| 102 | " | " | " | " | " | CN | H | $CH=C-CO_2C_2H_5$ <br> $\mid$ <br> $CN$ | CN | 642 | 81900 | 617 |
| 103 | " | " | " | " | " | CN | H | Cl | CN | 576 | 46420 | 579 |
| 104 | " | " | " | " | " | CN | H | $CH_3$ | CN | 557 | 38730 | 561 |
| 105 | " | " | " | " | $CH_3$ | Br | H | Cl | CN | 531 | 39350 | 541 |
| 106 | " | " | $C_2H_5$ | $CH(CH_3)C_2H_5$ | H | CN | H | $C_2H_5$ | Br | 425 | 25910 | 435 |
| 107 | " | " | " | $C_2H_5$ | " | CN | H | $NO_2$ | CN | 525 | 39240 | 533 |
| 108 | " | " | " | " | " | CN | H | $SO_2NH(CH_2)_3OCH_3$ | CN | 615 | 71520 | 617 |
| 109 | " | " | " | " | $OCH_3$ | CN | H | $CH=C(CN)_2$ | CN | 616 | 71280 | 617 |
| 110 | " | " | " | " | " | CN | H | $COCH_3$ | CN | 680 | 117700 | 629 |
| 111 | " | " | " | " | " | CN | H | CN | $NO_2$ | 624 | 76110 | 624 |
| 112 | " | " | " | " | " | CN | H | $NO_2$ | CN | 622 | 68710 | 620 |
| 113 | " | " | " | " | " | CN | H | H | Br | 645 | 93430 | 646 |
| 114 | $C_4H_9$ | $C_4H_9$ | " | $C_2H_4CN$ | " | Br | H | $CH_3$ | Br | 393 | 18240 | 415 |
| 115 | " | " | " | " | " | Br | H | $CH_3$ | Br | 397 | 18970 | 415 |
| 116 | " | " | H | " | " | Br | H | Br | $CH_3$ | 394 | 21960 | 411 |
| 117 | " | " | " | " | " | $CH_3$ | H | H | $CH_3$ | 390 | 20330 | 407 |
| 118 | $C_2H_4OC_2H_5$ | $C_2H_4OC_2H_5$ | " | $CH(CH_3)CH_2OCH_3$ | $OCH_3$ | CN | H | $C_2H_4CN$ | CN | 561 | 36870 | 566 |
| 119 | $C_4H_9$ | $C_4H_9$ | " | " | " | CN | H |  | CN | 571 | 43780 | 568 |
| 120 | " | " | $C_2H_5$ | $C_2H_5$ | " | CN | H | $\begin{array}{c}O\phantom{x}O\\ \diagdown\phantom{x}\diagup\\ CH\end{array}$ | CN | 592 | 51450 | 595 |
| 121 | " | " | " | " | " | CN | H | $CH=C(CN)_2$ | CN | 680 | 121600 | 674 |
| 122 | " | " | " | " | " | CN | H | $CH=C-CO_2C_2H_5$ <br> $\mid$ <br> $CN$ | CN | 666 | 101200 | 665 |
| 123 | " | " | " | " | " | CN | H | CN | CN | 624 | 84180 | 626 |
| 124 | " | " | " | " | " | CN | H | $NO_2$ | CN | 644 | 91680 | 646 |
| 125 | " | " | " | " | " | CN | $CH_3$ | $NO_2$ | CN | 634 | 80120 | 636 |
| 126 | $CH_3$ | $CH_3$ | $C_4H_9$ | $C_4H_9$ | " | CN | H | $CH=C-CO_2(C_2H_4O)_2C_2H_5$ <br> $\mid$ <br> $CN$ | $NO_2$ | 668 | 96620 | 664 |
| 127 | " | " | " | " | " | CN | H | CN | $NO_2$ | 625 | 76970 | 624 |
| 128 | " | " | " | " | " | CN | H | $NO_2$ | CN | 646 | 91730 | 649 |
| 129 | " | " | " | " | " | CN | H | $NO_2$ | $NO_2$ | 646 | 33670 | 645 |
| 130 | $C_6H_5$ | $C_6H_5$ | " | " | " | CN | H | $CH=C(CN)_2$ | CN | 684 | 121700 | 633 |

TABLE 1-continued

| Compound No. | X₁ | X₂ | Y₁ | Y₂ | Z₁ | A₂ | E₁ | B₁ | A₁ | $\lambda_{max}^{CHCl_3}$ | ε mol | $\lambda_{max}^{Gel}$ |
|---|---|---|---|---|---|---|---|---|---|---|---|---|
| 131 | C₂H₅ | " | " | CH(CH₃)CH₂CH(CH₃)₂ | " | CN | H | CH=C(CN)—CO₂C₂H₅ | CN | 667 | 99060 | 664 |
| 132 | " | CH₃ | H | CH(CH₃)CH₂CH(CH₃)₂ | " | CN | H | H | CN | 564 | 40530 | 569 |
| 133 | C₂H₄OC₂H₅ | C₂H₄OC₂H₅ | C₂H₅ | C₂H₅ | H | CN | H | CH₃ | CN | 560 | 39480 | 567 |
| 134 | C₂H₂Cl | C₂H₂Cl | CH₃ | CH₃ | CH₃ | CN | H | NO₂ | NO₂ | 644 | 78950 | 645 |
| 135 | C₈H₁₇ | C₈H₁₇ | H | C₂H₄CN | H | CN | H | H | H | 470 | 21750 | 477 |
| 136 | " | " | " | " | " | Br | H | NO₂ | H | 546 | 36630 | 541 |
| 137 | " | " | " | " | " | Br | H | H | H | 389 | 17170 | 415 |
| 138 | " | " | " | " | " | Br | H | CH₃ | Br | 394 | 18290 | 416 |
| 139 | " | " | " | " | " | Br | H | CH₃ | Br | 394 | 20410 | 410 |
| 140 | " | " | " | CH(CH₃)CH₂OCH₃ | OCH₃ | Br | H | CH₃ | CH₃ | 442 | 18310 | 452 |
| 141 | " | " | C₂H₅ | CH(CH₃)CH₂OCH₃ | " | CN | H | H | CN | 565 | 40460 | 567 |
| 142 | " | " | H | " | " | CN | H | NO₂ | CN | 635 | 83800 | 635 |
| 143 | " | " | C₂H₅ | " | " | CN | CH₃ | CH₃ | CN | 548 | 36510 | 561 |
| 144 | " | " | H | " | " | H | H | NO₂ | CN | 529 | 32560 | 531 |
| 145 | " | " | C₂H₅ | C₂H₅ | " | CN | H | CN | NO₂ | 622 | 77780 | 620 |
| 146 | C₄H₉ | C₄H₉ | H | CH(CH₃)CH₂OCH₃ | " | CN | H | H | CN | 563 | 38620 | 565 |
| 147 | CH₂C₆H₅ | CH₂C₆H₅ | " | CH₂C₆H₅ | " | CN | H | H | CN | 548 | 42680 | 566 |
| 148 | C₄H₉ | C₄H₉ | C₂H₅ | CH(CH₃)CH₂OCH₃ | " | CN | H | C₂H₅ | CN | 559 | 31880 | 562 |
| 149 | " | " | H | C₂H₅ | " | CN | H | NO₂ | CN | 649 | 87910 | 655 |
| 150 | " | " | C₂H₅ | CH(CH₃)CH₂OCH₃ | " | CN | CO₂CH₂CH(CH₃)₂ | CH₃ | CN | 555 | 37870 | 560 |
| 151 | C₂H₅ | CH₃ | " | CHCH₂CH(CH₃)—CH₃ | " | NO₂ | H | CN | H | 547 | 41390 | 549 |
| 152 | " | C₂H₅ | " | CHCH₂OCH₃—CH₃ | OC₂H₄OCH₃ | CN | H | CH₃ | CN | 547 | 35830 | 549 |
| 153 | " | " | " | CH(CH₃)CH₂OCH₃ | OCH₃ | CN | H | H | CN | 565 | 39140 | 568 |
| 154 | " | " | " | " | " | CN | H | C₆H₁₁ | CN | 560 | 33120 | 565 |
| 155 | " | " | " | " | " | CN | H | CH₂CH(CH₃)₂ | CN | 558 | 36930 | 553 |
| 156 | " | " | " | CH—CH₂CH(CH₃)₂—CH₃ | " | CN | H | CH₃ | CN | 560 | 38910 | 563 |
| 157 | " | " | " | CHC₂H₅—CH₃ | CH₃ | CN | H | Cl | CN | 531 | 39350 | 541 |
| 158 | " | " | C₂H₅ | C₂H₅ | H | CN | H | CH₂CH₃ | CN | 525 | 39240 | 533 |
| 159 | C₄H₉ | C₄H₉ | H | C₂H₄CN | " | H | CO₂C₂H₅ | H | H | 406 | 25340 | 433 |
| 160 | " | " | " | " | " | Br | H | C₄H₉ | Br | 396 | 18400 | 415 |
| 161 | " | " | " | " | " | Br | H | CH₃ | H | 414 | 24080 | 438 |

TABLE 1-continued

| Compound No. | $X_1$ | $X_2$ | $Y_1$ | $Y_2$ | $Z_1$ | $A_2$ | $E_1$ | $B_1$ | $A_1$ | $\lambda_{max}^{CHCl_3}$ | $\epsilon$ mol | $\lambda_{max}^{Gel}$ |
|---|---|---|---|---|---|---|---|---|---|---|---|---|
| 162 | " | " | | | $OC_2H_4OCH_3$ | Br | $OC_2H_5$ | $CH_3$ | Br | 396 | 20050 | 407 |
| 163 | " | " | " | $CHCH_2OCH_3$<br>$\|$<br>$-CH_3$ | $OCH_3$ | CN | H | $CH_3$ | CN | 554 | 36130 | 556 |
| 164 | " | " | " | " | " | CN | H | $OC_2H_4CH(CH_3)_2$ | CN | 546 | 31250 | 557 |
| 165 | $CH(CH_3)_2$ | $CH(CH_3)_2$ | " | $CHCH_2CH(CH_3)_2$<br>$\|$<br>$-CH_3$ | " | CN | H | H | CN | 564 | 39680 | 567 |
| 166 | $CH_2CH\genfrac{}{}{0pt}{}{CH_3}{CH_3}$ | $CH_2CH\genfrac{}{}{0pt}{}{CH_3}{CH_3}$ | " | $CHCH_2OCH_3$<br>$\|$<br>$-CH_3$ | " | CN | H | $CH_3$ | CN | 559 | 37770 | 561 |
| 167 | $CH(CH_3)_2$ | $CH(CH_3)_2$ | " | $CHCH_2CH(CH_3)_2$<br>$\|$<br>$-CH_3$ | " | CN | H | H | CN | 564 | 39680 | 567 |
| 168 | " | " | " | " | " | CN | H | $CH_3$ | CN | 559 | 37430 | 560 |
| 169 | $CH_2CH(CH_3)_2$ | $CH_2CH(CH_3)_2$ | " | $CHCH_2OCH_3$<br>$\|$<br>$-CH_3$ | " | CN | H | H | CN | 563 | 39380 | 565 |
| 170 | " | " | " | " | " | CN | H | $CH_3$ | CN | 559 | 37770 | 561 |
| 171 | " | " | " | $CHCH_2CH(CH_3)_2$<br>$\|$<br>$-CH_3$ | " | CN | H | H | CN | 566 | 42800 | 567 |
| 172 | " | " | " | " | " | CN | H | $CH_3$ | CN | 562 | 41560 | 562 |
| 173 | $C_4H_9$ | $C_4H_9$ | " | $CHCH_2OCH_3$<br>$\|$<br>$-CH_3$ | " | H | $CF_3$ | $NO_2$ | H | 529 | 35020 | 537 |
| 174 | $CH(CH_3)_2$ | $CH(CH_3)_2$ | " | $CH-CH_2CH(CH_3)_2$<br>$\|$<br>$CH_3$ | " | H | H | $COOC_2H_5$ | $NO_2$ | 535 | 36500 | 541 |
| 175 | $C_2H_4Cl$ | $C_2H_4Cl$ | $CH_3$ | $CH_3$ | $CH_3$ | H | H | $NO_2$ | $COOC_2H_5$ | 503 | 19090 | 509 |
| 176 | $CH_2CH(CH_3)_2$ | $CH_2CH(CH_3)_2$ | H | $CHCH_2OCH_3$<br>$\|$<br>$-CH_3$ | $OCH_3$ | $SO_2C_4H_9$ | H | $SO_2C_4H_9(i)$ | H | 535 | 31010 | 537 |
| 177 | $C_2H_5$ | $C_2H_5$ | $C_2H_5$ | $C_2H_5$ | " | $SO_2CH_3$ | H | $NO_2$ | $CF_3$ | 611 | 42510 | 622 |

TABLE 1-continued

| Compound No. | $X_1$ | $X_2$ | $Y_1$ | $Y_2$ | $Z_1$ | $A_2$ | $E_1$ | $B_1$ | $A_1$ | $\lambda_{max}^{CHCl_3}$ | $\epsilon$ mol | $\lambda_{max}^{Gel}$ |
|---|---|---|---|---|---|---|---|---|---|---|---|---|
| 178 | $CH_2CH(CH_3)_2$ | $CH_2CH(CH_3)_2$ | H | $CHCH_2CH(CH_3)_2$<br>$\|$<br>$CH_3$ | " | H | H | $NO_2$ | H | 533 | 37580 | 538 |
| 179 | " | " | " | $CHCH_2OCH_3$<br>$\|$<br>$CH_3$ | " | H | H | $SO_2mC_6H_5CH_3$ | H | 501 | 32620 | 504 |
| 180 | $CH(CH_3)_2$ | $CH(CH_3)_2$ | " | $CHCH_2CH(CH_3)_2$<br>$\|$<br>$CH_3$ | " | H | $CH_3$ | $NO_2$ | H | 521 | 30580 | 526 |
| 181 | $C_2H_5$ | $C_2H_5$ | " | " | " | H | H | $NO_2$ | H | 533 | 36690 | 538 |
| 182 | " | " | " | " | " | H | $CH_3$ | $NO_2$ | H | 520 | 35010 | 526 |
| 183 | " | " | $C_2H_5$ | $C_2H_5$ | " | H | $CH_3$ | $NO_2$ | H | 527 | 31310 | 535 |

TABLE 2

| Compound No. | $X_1$ | $X_2$ | $Y_2$ | $Y_1$ and $Z_1$ together | $A_2$ | $E_1$ | $B_1$ | $A_1$ | $\lambda_{max}^{CHCl_3}$ | $\epsilon$ mol | $\lambda_{max}^{Gel}$ |
|---|---|---|---|---|---|---|---|---|---|---|---|
| 281 | $C_2H_5$ | $C_2H_5$ | $C_2H_5$ | —C(CH$_3$)$_2$CH$_2$CH(CH$_3$)— | CN | H | NO$_2$ | CN | 628 | 82880 | 630 |
| 282 | $C_2H_5$ | $C_2H_5$ | $C_2H_5$ | " | CN | H | NO$_2$ | NO$_2$ | 623 | 68610 | 623 |

TABLE 3

| Compound No. | $X_1$ | $X_2$ | $Y_1$ | $Y_2$ | $Z_1$ | $A_2$ | $E_1$ and $B_1$ together | $A_1$ | $\lambda_{max}^{CHCl_3}$ | $\epsilon_{mol}$ | $\lambda_{max}^{Gel}$ |
|---|---|---|---|---|---|---|---|---|---|---|---|
| 383 | $C_4H_9$ | $C_4H_9$ | H | $C_2H_4CN$ | H | Br | (CH$_2$)$_3$— | Br | 393 | 21210 | 410 |
| 384 | $C_4H_9$ | $C_4H_9$ | H | CHCH$_2$OCH$_3$ / CH$_3$ | OCH$_3$ | CN | (CH$_2$)$_3$— | CN | 545 | 37340 | 560 |
| 385 | $C_2H_5$ | $C_2H_5$ | H | CHCH$_2$CH(CH$_3$)$_2$ / CH$_3$ | OCH$_3$ | CN | (CH$_2$)$_3$— | CN | 545 | 38420 | 564 |
| 386 | $C_2H_5$ | $C_2H_5$ | $C_2H_5$ | $C_2H_5$ | OCH$_3$ | CN | —C(O)—N((CH$_2$)$_2$OCH$_3$)—C(O)— | CN | 638 | 29620 | 638 |

The dyes listed in Table 4 below can also be prepared by the method described in Example 3.

TABLE 4

| Compound No. | | $\lambda_{max}^{CHCl_3}$ | $\epsilon_{mol}$ | $\lambda_{max}^{gel}$ |
|---|---|---|---|---|
| 401 | | 641 | 45060 | 643 |
| 402 | | 559 | 36790 | 565 |
| 403 | | 527 | 44260 | 536 |
| 404 | | 551 | 40150 | 552 |

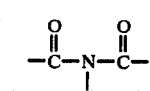

TABLE 4-continued

| Compound No. | | $\lambda_{max}^{CHCl_3}$ | $\epsilon_{mol}$ | $\lambda_{max}^{gel}$ |
|---|---|---|---|---|
| 405 | (structure) | 536 | 39000 | 538 |
| 406 | (structure) | 556 | 26820 | 540 |
| 407 | (structure) | 543 | 38720 | 545 |

EXAMPLE 4

11 mg of the dye of the formula

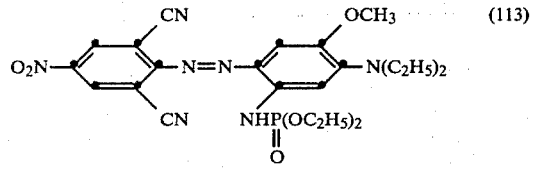

are dissolved in 2 ml of a 9:1 mixture of ethyl acetate and tricresyl phosphate. This solution is added to a mixture of 6.6 ml of a 6% gelatin solution and 1.4 ml of a 3% solution of dibutylnaphthalenesulfonic acid. The entire mixture is emulsified with ultrasonics. 2.5 ml of this dye emulsion are mixed with 2 ml of a 4% gelatin solution, 5 ml of water, 1 ml of a 1% hardener solution and 0.5 ml of a silver iodide/gelatin emulsion which contains about 22 g of silver per kg of gelatin. The mixture is cast on an opaque triacetate base (size 13×18 cm) and dried. A strip (size 3.5×18 cm) of this material is exposed behind a step wedge and Kodak filters (2B and 47B) and is then processed further at 24° C., as follows:

| 6 minutes developing with a solution of the following composition (per liter of solution): | |
|---|---|
| sodium sulfite | 50 g |
| 1-phenyl-3-pyrazolidone | 0.2 g |
| hydroquinone | 6 g |
| sodium carbonate | 35 g |
| potassium bromide | 4 g |
| benzotriazole | 0.3 g |

4 minutes washing
6 minutes bleaching
2 minutes washing

| 8 minutes fixing with a solution of the following composition (per liter of solution): | |
|---|---|
| sodium thiosulfate | 200 g |
| sodium metabisulfite | 20 g |

6 minutes washing
final drying.

| The bleaching bath used contains the following components: | |
|---|---|
| water | 1,950 ml |
| concentrated sulfuric acid | 56 ml |
| 4-mercaptobutyric acid | 2 ml |
| sodium iodide | 18 g |
| disodium salt of 4-nitrophenol-2-sulfonic acid | 12 g |
| 6-methoxy-2,3-dimethylquinoxaline | 2 g |

In this way, a brilliant, light-fast cyan wedge is obtained. The dye is bleached completely white where originally the silver density was highest.

EXAMPLE 5

An opaque triacetate base is coated as described in Example 4, except that the silver halide gelatin emulsion contains 16 mg of dye of the formula

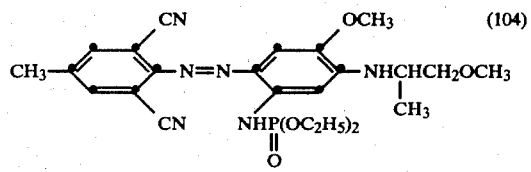

After exposing and processing the material as described in Example 4, a very light-fast brilliant magenta wedge is obtained.

EXAMPLE 6

An opaque triacetate base is coated as described in Example 4, except that the silver halide gelatin emulsion contains 37 mg of the formula

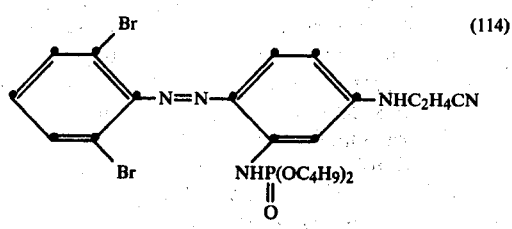
(114)

After exposing and processing the material as described in Example 4, a very light-fast brilliant yellow wedge is obtained.

EXAMPLE 7

235 mg of the dye of the formula

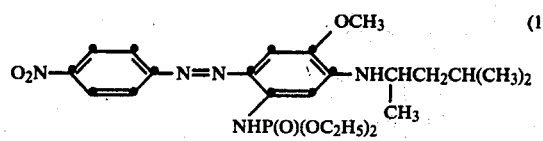
(182)

and 470 mg of tris-(isopropylphenyl) phosphate are dissolved in 10 ml of ethyl acetate. This solution is added to 21.6 g of a 10% gelatin solution and 0.8 ml of a 4.6% solution of sodium dibutylnaphthalenesulfonate. The mixture is made up to 80 g with 15 ml of a 1% hardener solution and with water, and is emulsified with ultrasonics. The resulting dye emulsion is mixed with 20 g of a green-sensitised gelatin/silver bromide-iodide emulsion. The silver content is 22.6 g per kg of gelatin. 86 ml of this mixture are cast on a triacetate base (1 m²) and dried. The resulting light-sensitive material is exposed with green light behind a step wedge, and is processed at 30° C., as follows:

| | |
|---|---|
| developing | 3 minutes |
| washing | 1 minute |
| silver bleaching and dye bleaching | 5 minutes |
| washing | 1 minute |
| fixing | 4 minutes |
| washing | 6 minutes |
| drying | |

The developer bath has the following composition per liter of solution:

| | |
|---|---|
| sodium sulfite | 50 g |
| 1-phenyl-3-pyrazolidone | 0.2 g |
| hydroquinone | 6 g |
| sodium carbonate | 35 g |
| potassium bromide | 4 g |
| benzotriazole | 0.3 g |

The silver dye bleach bath has the following composition per liter of solution:

| | |
|---|---|
| concentrated sulfuric acid | 28 ml |
| sodium iodide | 9 g |
| disodium salt of 4-nitrophenol-2-sulfonic acid | 6 g |
| 6-methoxy-2,3-dimethylquinoxaline | 1 g |
| sodium salt of bis-(2-cyanoethyl)-(2-sulfoethyl) phosphine | 3 g |

The fixing bath contains, per liter of solution:

| | |
|---|---|
| sodium thiosulfate | 200 g |
| sodium metabisulfite | 20 g |

A brilliant light-fast magenta wedge is obtained, which is bleached completely white where originally the silver density was greatest.

DYEING EXAMPLES

EXAMPLE 8

1 part of the dye of the formula

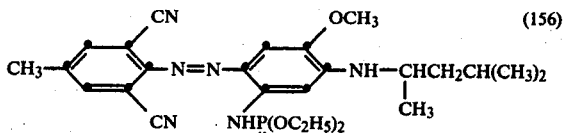
(156)

is milled wet with 2 parts of a 50% aqueous solution of sodium dinaphthylmethanedisulfonate, and the mixture is dried.

This dye preparation is stirred with 40 parts of a 10% aqueous solution of sodium N-butyl-μ-heptadecylbenzimidazoledisulfonate and 4 parts of a 40% acetic acid solution are added. 4,000 parts of a dyebath are prepared from this mixture by dilution with water.

100 parts of a cleaned polyester fabric is introduced into this bath at 50° C., the temperature is raised to 120°–130° C. in the course of half an hour, and the fabric is dyed at this temperature, with the vessel closed, for one hour. It is then rinsed. A level intense bluish red dyeing having the original light-fastness, and good sublimation fastness, is obtained.

EXAMPLE 9

25 parts of the dye used in Dyeing Example 8 were finely milled and then mixed with 550 parts of an 8% aqueous modified carob bean flour thickener, 50 parts of a 10% solution of sodium m-nitrobenzenesulfonate and 10 parts of a mixture of potassium oleate and pine oil, and the batch is made up to 1,000 parts with water.

The mixture is stirred by means of a high-speed stirrer until the dye is completely dispersed, and polyethylene glycol terephthalate fabric is then printed with this paste. After having been printed, the fabric is dried and steamed for 20 minutes at 1½ atmospheres gauge pressure, rinsed for 10 minutes with cold water, soaped hot twice, in the presence of a small amount of hydrosulfite, rinsed cold and dried. A fast bluish red print is obtained.

EXAMPLE 10

Carrier dyeing method 0.1 g of finely dispersed dye of the formula

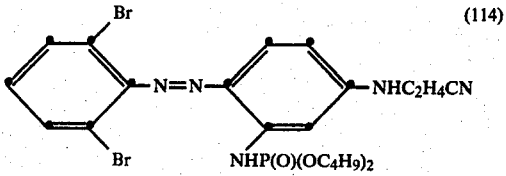
(114)

0.5 g/l of a fatty acid tauride (wetting agent), 0.5 g/l of a naphthalenesulfonic acid/formaldehyde condensate (dispersant), 0.5 g/l of ammonium sulfate and 5 g/l of an o-phenyl-phenol carrier are initially introduced into 500 ml of water at 70° C., in an open dyeing vessel. 10 g of a Diolen (polyester) fabric are then dyed as follows: the fabric is introduced into the dyeing liquor at 70° C. and the temperature of the liquor is raised to 100° C. in the course of 30 minutes. The fabric is then dyed at this temperature for 90 minutes.

The resulting dyeing is rinsed hot and cold, reductively cleaned with sodium hydrosulfite, again rinsed, and dried.

An orange fabric having generally good fastness characteristics in use is obtained.

EXAMPLE 11

Thermosol process 20 g/l of finely dispersed dye of the formula

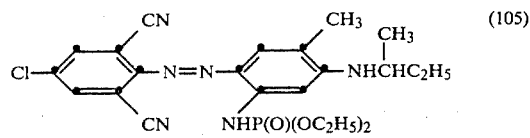

are homogenised in 200 g/l of a 2.5% sodium alginate thickener and 2 g/l of sodium dibutylnaphthalenesulfonate (wetting agent).

A Diolen fabric is padded with this dyeing liquor, to a wet pick-up of 65%, dried for 2 minutes at 100° C. and thermofixed for 60 seconds at 210° C. After the fabric has been rinsed, reductively cleaned and dried, a strongly bluish red dyeing having good light-fastness is obtained.

What is claimed is:

1. An azo dye of the formula

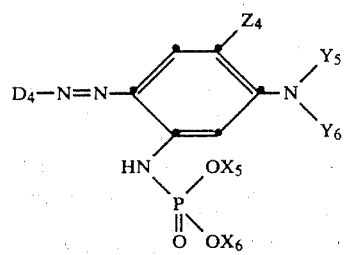

in which $X_5$ and $X_6$ independently of one another are alkyl having 1 to 12 carbon atoms, which is unsubstituted or substituted by hydroxyl, methoxy, ethoxy, cyano, fluorine, chlorine or bromine, or are phenyl or benzyl, $Y_5$ is hydrogen or alkyl having 1 to 5 carbon atoms which is unsubstituted or substituted by alkoxy having 1 to 4 carbon atoms, $Y_6$ is hydrogen or alkyl having 1 to 8 carbon atoms which is unsubstituted or substituted by methoxy, phenyl, hydroxyl, fluorine, chlorine, bromine, carbalkoxy having 2 to 6 carbon atoms, a radical of the formula

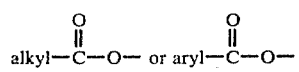

where the alkyl moiety contains 1 to 6 carbon atoms and the aryl moiety is phenyl which is unsubstituted or substituted by chlorine, bromine, cyano or nitro, or cyano or is phenyl which is unsubstituted or substituted by alkyl or alkoxy each having 1 to 5 carbon atoms, or by chlorine, or $Y_5$ together with $Y_6$ stands for the atoms required to complete a pyrrolidine ring which is unsubstituted or substituted by carbalkoxy having 2 to 5 carbon atoms, $Z_4$ is hydrogen, alkyl or alkoxy each having 1 to 4 carbon atoms, or alkoxy having 1 or 2 carbon atoms which is substituted by methoxy or ethoxy, or $Z_4$ is chlorine, bromine, cyano or carbalkoxy having 2 to 5 carbon atoms, or stands for the atoms which together with $Y_5$ form a methyl-substituted piperidine ring, $D_4$ is thiaziazolyl which is unsubstituted or substituted by chlorine or phenyl or imidazolyl which is unsubstituted or substituted by cyano, and in which at least one of the nitrogen atoms is unsubstituted or substituted by $-C_2H_4OC_6H_5$, or is benzthiazolyl or benzisothiazolyl which are both unsubstituted or substituted by nitro groups, or thienyl which is unsubstituted or substituted by methyl or carbethoxy or methyl and carbethoxy, or is a radical of the formula

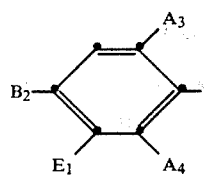

in which $A_3$ and $A_4$ independently of one another are hydrogen, alkyl having 1 to 4 carbon atoms, carbalkoxy having 2 to 5 carbon atoms, carbalkoxyethoxy having 1 to 4 carbon atoms in the alkoxy moiety, trifluoromethyl, cyano, nitro, alkylsulfone having 1 to 5 carbon atoms or halogen, $B_2$ is hydrogen or alkyl having 1 to 4 carbon atoms which are unsubstituted or substituted by cyano, nitro, chlorine, trifluoromethyl, bromine, acetyl, benzoyl, carbmethoxy, carbethoxy, methoxy, ethoxy or cyano- or carbethoxy- or cyano- and carbethoxy substituted vinyl, or is alkoxy having 1 or 2 carbon atoms or is alkenyl having 2 to 4 carbon atoms which are unsubstituted or substituted by cyano, nitro, chlorine, trifluoromethyl, bromine, acetyl, benzoyl, carbmethoxy, carbethoxy, methoxy, ethoxy or cyano- or carbethoxy- or cyano- and carbethoxy-substituted vinyl, or is $T_2-CO-$, in which $T_2$ is methyl or phenyl, or $B_2$ is carbalkoxy having 2 to 5 carbon atoms, alkylsulfone having 1 to 6 carbon atoms, phenylsulfone, N-alkyl-substituted or N,N-dialkyl-substituted sulfonamido, in which each alkyl moiety has 1 or 2 carbon atoms and is unsubstituted or methoxy-substituted, cyano, nitro or halogen, and $E_1$ is hydrogen, alkyl having 1 to 4 carbon atoms or cyano, nitro, chlorine, trifluoromethyl, bromine, acetyl, benzoyl, carbmethoxy, carbethoxy, methoxy, ethoxy or cyano- or carbethoxy- or cyano- and carbethoxy-substituted vinyl, or stands for the atoms which together with $B_2$ form a propylene or imido group, in which the nitrogen atom is alkoxyalkyl-substituted, the alkoxy and alkyl moieties each having 1 to 4 carbon atoms.

2. An azo dye according to claim 1 of the formula

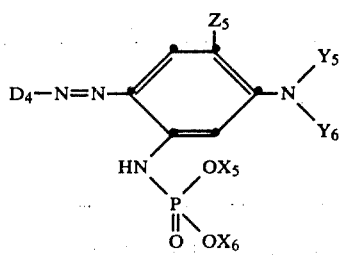

in which $Z_5$ is hydrogen, alkyl or alkoxy each having 1 to 4 carbon atoms or —$OC_2H_4OCH_3$, or stands for the atoms which together with $Y_5$ form a pyridine ring and $X_5$, $X_6$, $Y_5$, $Y_6$ and $D_4$ are as defined in claim 1.

3. An azo dye according to claim 2, of the formula

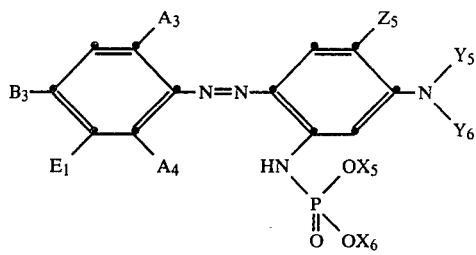

in which $B_3$ is hydrogen or alkyl having 1 to 4 carbon atoms which is unsubstituted or substituted by cyano or cyano and carbethoxy, or is alkenyl having 2 to 4 carbon atoms which is unsubstituted or substituted by cyano and/or carbethoxy, or is acetyl, benzoyl, cyano, nitro, halogen, alkylsulfone having 1 to 6 carbon atoms or N-alkyl-substituted or N,N-dialkyl-substituted sulfonamido in which each alkyl moiety has 1 or 2 carbon atoms, and $X_5$, $X_6$, $Y_5$, $Y_6$, $Z_5$, $A_3$, $A_4$ and $E_1$ are as defined in claim 2.

4. An azo dye according to claim 3, of the formula

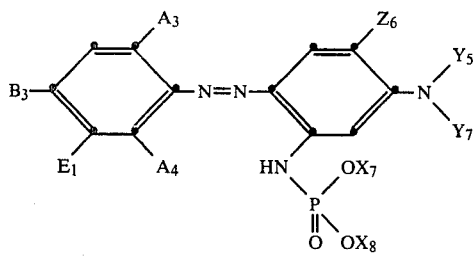

in which $X_7$ and $X_8$ have the same meaning and each is alkyl having 1 to 12 carbon atoms, substituted by hydroxyl, methoxy, ethoxy, cyano or chlorine, or is phenyl or benzyl, $Y_7$ is hydrogen or alkyl having 1 to 6 carbon atoms which is substituted or substituted by methoxy, phenyl, cyano, hydroxyl, chlorine, carbethoxy, acetoxy or benzoyloxy, or is phenyl, $Z_6$ is hydrogen, alkyl having 1 to 4 carbon atoms or alkoxy having 1 to 4 carbon atoms and $Y_5$, $A_3$, $A_4$, $B_3$ and $E_1$ are as defined in claim 3.

5. An azo dye according to claim 4, of the formula

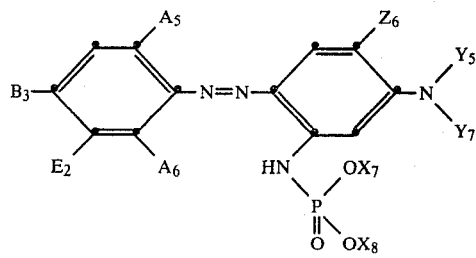

in which $A_5$ and $A_6$ are hydrogen, trifluoromethyl, methyl, cyano, nitro or halogen, $E_2$ is hydrogen, methyl, carbalkoxy having 2 to 5 carbon atoms, trifluoromethyl, nitro or chlorine and $X_7$, $X_8$, $Y_5$, $Y_7$, $Z_6$ and $B_3$ are as defined in claim 4.

6. An azo dye according to claim 5, of the formula

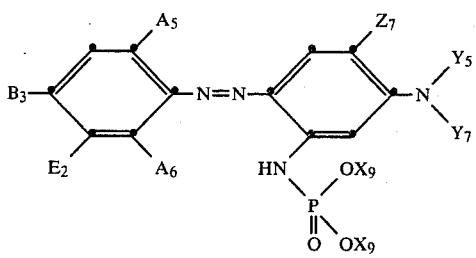

in which $X_9$ is alkyl having 1 to 12 carbon atoms, $Z_7$ is hydrogen or alkoxy having 1 to 4 carbon atoms and $Y_5$, $Y_7$, $A_5$, $A_6$ and $B_3$ are as defined in claim 5.

7. An azo dye according to claim 6, of the formula

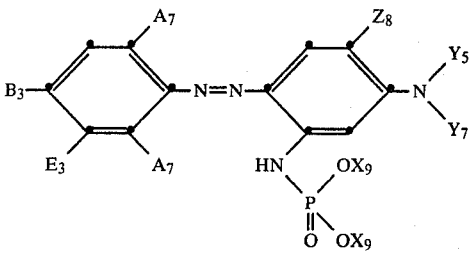

in which $Z_8$ is hydrogen or methoxy, $A_7$ is cyano, nitro or bromine, $E_3$ is hydrogen, carbomethoxy or methyl and $X_9$, $Y_5$, $Y_7$ and $B_3$ are as defined in claim 6.

8. An azo dye according to claim 7, of the formula

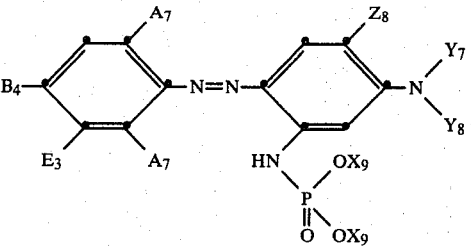

in which $Y_8$ is hydrogen or alkyl having 1 to 4 carbon atoms, $B_4$ is hydrogen, alkyl having 1 or 2 carbon atoms, cyano or cyano and carbethoxy-substituted vinyl, acetyl, benzoyl, cyano, nitro or halogen and $X_9$, $Y_7$, $Z_8$, $A_7$ and $E_3$ are as defined in claim 7.

* * * * *